(12) United States Patent
Mathieu et al.

(10) Patent No.: US 7,241,037 B2
(45) Date of Patent: *Jul. 10, 2007

(54) SIGNALING ASSEMBLY

(75) Inventors: Daniel J. Mathieu, Sheboygan Falls, WI (US); Daniel R. Todd, Sheboygan, WI (US); Allen A. Bukosky, Sheboygan, WI (US)

(73) Assignee: K.W. Muth Company, Sheboygan, WI (US)

( * ) Notice: Subject to any disclaimer, the term of this patent is extended or adjusted under 35 U.S.C. 154(b) by 240 days.

This patent is subject to a terminal disclaimer.

(21) Appl. No.: 11/088,665

(22) Filed: Mar. 23, 2005

(65) Prior Publication Data

US 2006/0215413 A1    Sep. 28, 2006

(51) Int. Cl.
*B60Q 1/26* (2006.01)
*B60R 1/12* (2006.01)
(52) U.S. Cl. .................. 362/494; 362/545; 340/475
(58) Field of Classification Search ............... 362/492, 362/494, 543–545; 340/468, 475
See application file for complete search history.

(56) References Cited

U.S. PATENT DOCUMENTS

| 2,060,401 A | 11/1936 | Smith |
| 2,180,610 A | 11/1939 | Ritz-Woller |
| 2,190,123 A | 2/1940 | Pace |
| 2,263,382 A | 11/1941 | Gotzinger |
| 2,580,014 A | 12/1951 | Gazda |
| 2,595,331 A | 5/1952 | Calihan et al. |
| 3,040,207 A | 6/1962 | Grontikowski |
| 3,266,012 A | 8/1966 | Maruyama et al. |
| 3,280,701 A | 10/1966 | Donnelly et al. |
| 3,436,758 A | 4/1969 | Kluth |
| 3,449,626 A | 6/1969 | De Coye De Castelet |
| 3,532,871 A | 10/1970 | Shipman |
| 3,543,018 A | 11/1970 | Barcus et al. |
| 3,665,392 A | 5/1972 | Annas |
| 3,840,851 A | 10/1974 | Fowler et al. |
| 4,005,928 A | 2/1977 | Kmetz et al. |
| 4,023,029 A | 5/1977 | Fischer |
| 4,040,726 A | 8/1977 | Paca |
| 4,066,332 A | 1/1978 | Kato et al. |
| 4,158,483 A | 6/1979 | Fisher et al. |
| 4,274,078 A | 6/1981 | Isobe et al. |

(Continued)

FOREIGN PATENT DOCUMENTS

GB            268359            7/1927

(Continued)

OTHER PUBLICATIONS

US 4,886,950, 12/1989, Molyneux et al. (withdrawn)

*Primary Examiner*—Sandra O'Shea
*Assistant Examiner*—Jason Moon Han
(74) *Attorney, Agent, or Firm*—Wells St. John P.S.

(57) ABSTRACT

A signal assembly is described and which includes a mirror which is operable to reflect, and pass electromagnetic radiation; a circuit substrate having a plurality of electrically conductive pathways which is borne on same; a light emitting device borne by the circuit substrate, and which, when energized, emits visibly discernable electromagnetic radiation which passes by each of the circuit substrate and the mirror; and an electrically actuated assembly, such as a heater, which may be electrically coupled with a source of electricity by way of the circuit substrate.

43 Claims, 12 Drawing Sheets

U.S. PATENT DOCUMENTS

| | | |
|---|---|---|
| 4,299,444 A | 11/1981 | Romer |
| 4,443,057 A | 4/1984 | Bauer et al. |
| 4,463,411 A | 7/1984 | Proctor |
| 4,467,193 A | 8/1984 | Carroll |
| 4,475,100 A | 10/1984 | Duh |
| 4,479,172 A | 10/1984 | Connor |
| 4,491,390 A | 1/1985 | Tong-Shen |
| 4,499,451 A | 2/1985 | Suzuki et al. |
| 4,506,315 A | 3/1985 | Maekawa et al. |
| 4,516,197 A | 5/1985 | Yonkers |
| 4,583,155 A | 4/1986 | Hart |
| 4,588,267 A | 5/1986 | Pastore |
| 4,591,954 A | 5/1986 | Kawamura et al. |
| 4,603,946 A | 8/1986 | Kato et al. |
| 4,613,791 A | 9/1986 | Kurihara et al. |
| 4,623,222 A | 11/1986 | Itoh et al. |
| 4,626,967 A | 12/1986 | Segoshi |
| 4,630,904 A | 12/1986 | Pastore |
| 4,646,210 A | 2/1987 | Skogler et al. |
| 4,659,967 A | 4/1987 | Dahl |
| 4,665,321 A | 5/1987 | Chang et al. |
| 4,701,022 A | 10/1987 | Jacob |
| 4,715,698 A | 12/1987 | Haba |
| 4,721,364 A | 1/1988 | Itoh et al. |
| 4,733,335 A | 3/1988 | Serizawa et al. |
| 4,733,336 A | 3/1988 | Skogler et al. |
| 4,741,603 A | 5/1988 | Miyagi et al. |
| 4,791,534 A | 12/1988 | Lindberg |
| 4,793,690 A | 12/1988 | Gahan et al. |
| 4,799,768 A | 1/1989 | Gahan |
| 4,807,096 A | 2/1989 | Skogler et al. |
| 4,841,198 A | 6/1989 | Wilhelm |
| 4,862,330 A | 8/1989 | Machida et al. |
| 4,868,459 A | 9/1989 | Dennerlein et al. |
| 4,868,719 A | 9/1989 | Kouchi et al. |
| 4,882,565 A | 11/1989 | Gallmeyer |
| 4,893,063 A | 1/1990 | Pernyeszi |
| 4,902,108 A | 2/1990 | Byker |
| 4,916,430 A | 4/1990 | Vu et al. |
| 4,917,477 A | 4/1990 | Bechtel et al. |
| 4,929,866 A | 5/1990 | Murata et al. |
| 4,935,665 A | 6/1990 | Murata |
| 4,951,179 A | 8/1990 | Machida |
| 5,014,167 A | 5/1991 | Roberts |
| 5,029,060 A | 7/1991 | Aho et al. |
| 5,050,051 A | 9/1991 | Machida et al. |
| 5,059,015 A | 10/1991 | Tran |
| 5,066,112 A | 11/1991 | Lynam et al. |
| 5,069,535 A | 12/1991 | Baucke et al. |
| 5,072,340 A | 12/1991 | Jones |
| 5,076,673 A | 12/1991 | Lynam et al. |
| 5,093,768 A | 3/1992 | Ohe |
| 5,097,395 A | 3/1992 | Aho et al. |
| 5,115,346 A | 5/1992 | Lynam |
| 5,136,419 A | 8/1992 | Shabrang |
| 5,150,966 A | 9/1992 | Nelson |
| 5,165,772 A | 11/1992 | Wu |
| 5,174,649 A | 12/1992 | Alston |
| 5,189,537 A | 2/1993 | O'Farrell |
| 5,207,492 A | 5/1993 | Roberts |
| 5,211,466 A | 5/1993 | Jarocki et al. |
| 5,241,457 A | 8/1993 | Sasajima et al. |
| 5,253,109 A | 10/1993 | O'Farrell |
| 5,272,602 A | 12/1993 | Sasajima et al. |
| 5,285,060 A | 2/1994 | Larson et al. |
| 5,303,130 A | 4/1994 | Wei et al. |
| 5,313,335 A | 5/1994 | Gray et al. |
| 5,336,448 A | 8/1994 | Byker |
| 5,355,284 A | 10/1994 | Roberts |
| 5,361,190 A | 11/1994 | Roberts et al. |
| 5,371,659 A | 12/1994 | Pastrick et al. |
| 5,388,035 A | 2/1995 | Bodem, Jr. |
| 5,402,103 A | 3/1995 | Tashiro |
| 5,404,869 A | 4/1995 | Parkyn, Jr. et al. |
| 5,416,313 A | 5/1995 | Larson et al. |
| 5,436,741 A | 7/1995 | Crandall |
| 5,436,809 A | 7/1995 | Brassier et al. |
| 5,438,487 A | 8/1995 | Schmid et al. |
| D363,920 S | 11/1995 | Roberts et al. |
| 5,481,409 A | 1/1996 | Roberts |
| 5,497,305 A | 3/1996 | Pastrick et al. |
| 5,497,306 A | 3/1996 | Pastrick |
| 5,499,169 A | 3/1996 | Chen |
| 5,504,478 A | 4/1996 | Knapp |
| 5,528,422 A | 6/1996 | Roberts |
| 5,530,240 A | 6/1996 | Larson et al. |
| 5,575,552 A | 11/1996 | Faloon |
| 5,587,699 A | 12/1996 | Faloon et al. |
| 5,619,374 A | 4/1997 | Roberts |
| 5,619,375 A | 4/1997 | Roberts |
| 5,660,457 A | 8/1997 | Lyons |
| 5,668,663 A | 9/1997 | Varaprasad et al. |
| 5,669,704 A | 9/1997 | Pastrick |
| 5,669,705 A | 9/1997 | Pastrick et al. |
| 5,724,187 A | 3/1998 | Varaprasad et al. |
| D394,833 S | 6/1998 | Muth |
| 5,760,962 A | 6/1998 | Schofield et al. |
| 5,788,357 A | 8/1998 | Muth et al. |
| 5,818,625 A | 10/1998 | Forgette et al. |
| 5,825,527 A | 10/1998 | Forgette et al. |
| 5,863,116 A | 1/1999 | Pastrick et al. |
| 5,879,074 A | 3/1999 | Pastrick |
| 5,889,608 A | 3/1999 | Buffat et al. |
| D409,540 S | 5/1999 | Muth |
| 5,938,320 A | 8/1999 | Crandall |
| 5,959,367 A | 9/1999 | O'Farrell et al. |
| 5,984,496 A | 11/1999 | Malcomson |
| 6,005,724 A | 12/1999 | Todd |
| 6,007,222 A | 12/1999 | Thau |
| 6,045,243 A | 4/2000 | Muth et al. |
| D425,466 S | 5/2000 | Todd et al. |
| D426,506 S | 6/2000 | Todd et al. |
| D426,507 S | 6/2000 | Todd et al. |
| D427,128 S | 6/2000 | Mathieu |
| 6,076,948 A | 6/2000 | Bukosky et al. |
| D428,372 S | 7/2000 | Todd et al. |
| D428,373 S | 7/2000 | Todd et al. |
| 6,086,229 A | 7/2000 | Pastrick |
| 6,093,976 A | 7/2000 | Kramer et al. |
| D428,842 S | 8/2000 | Todd et al. |
| D429,202 S | 8/2000 | Todd et al. |
| D430,088 S | 8/2000 | Todd et al. |
| 6,111,684 A | 8/2000 | Forgette et al. |
| 6,142,656 A | 11/2000 | Kurth |
| 6,163,083 A | 12/2000 | Kramer et al. |
| 6,166,848 A | 12/2000 | Cammenga et al. |
| 6,175,164 B1 | 1/2001 | O'Farrell et al. |
| 6,176,602 B1 | 1/2001 | Pastrick et al. |
| 6,244,716 B1 | 6/2001 | Steenwyk et al. |
| 6,257,746 B1 | 7/2001 | Todd et al. |
| 6,276,821 B1 | 8/2001 | Pastrick et al. |
| 6,355,920 B1 | 3/2002 | Schofield et al. |
| 6,356,376 B1 | 3/2002 | Tonar et al. |
| 6,441,943 B1 | 8/2002 | Roberts et al. |
| 6,462,468 B1 | 10/2002 | Jones et al. |
| 6,512,203 B2 | 1/2003 | Jones et al. |
| 6,512,624 B2 | 1/2003 | Tonar et al. |
| 6,523,976 B1 | 2/2003 | Turnbull et al. |
| 6,583,919 B1 | 6/2003 | Mizutani et al. |
| 6,585,399 B2 | 7/2003 | Kreutzer et al. |
| 6,637,917 B2 | 10/2003 | Schwanz et al. |
| 6,644,838 B2 | 11/2003 | Stidham et al. |
| 6,650,457 B2 | 11/2003 | Busscher |
| 6,657,767 B2 | 12/2003 | Bonardi |

| | | | | | |
|---|---|---|---|---|---|
| 6,685,325 B1 | 2/2004 | Hulse et al. | 2004/0114384 A1 | 6/2004 | Carter et al. |
| 6,749,325 B2 | 6/2004 | Bukosky et al. | | | |
| 2002/0011477 A1 | 1/2002 | Jones et al. | | | |
| 2002/0032510 A1 | 3/2002 | Turnbull et al. | FOREIGN PATENT DOCUMENTS | | |
| 2003/0002179 A1 | 1/2003 | Roberts et al. | | | |
| 2003/0007362 A1 | 1/2003 | Robison | GB | 1172382 | 11/1969 |

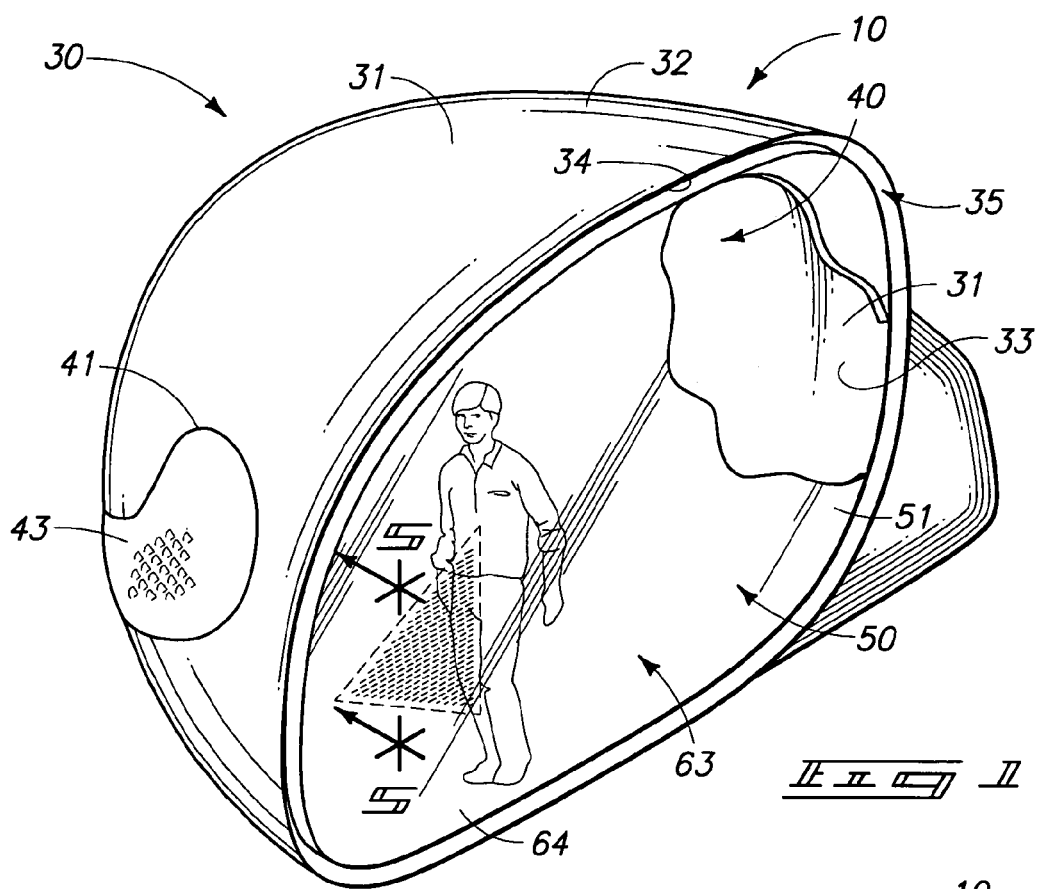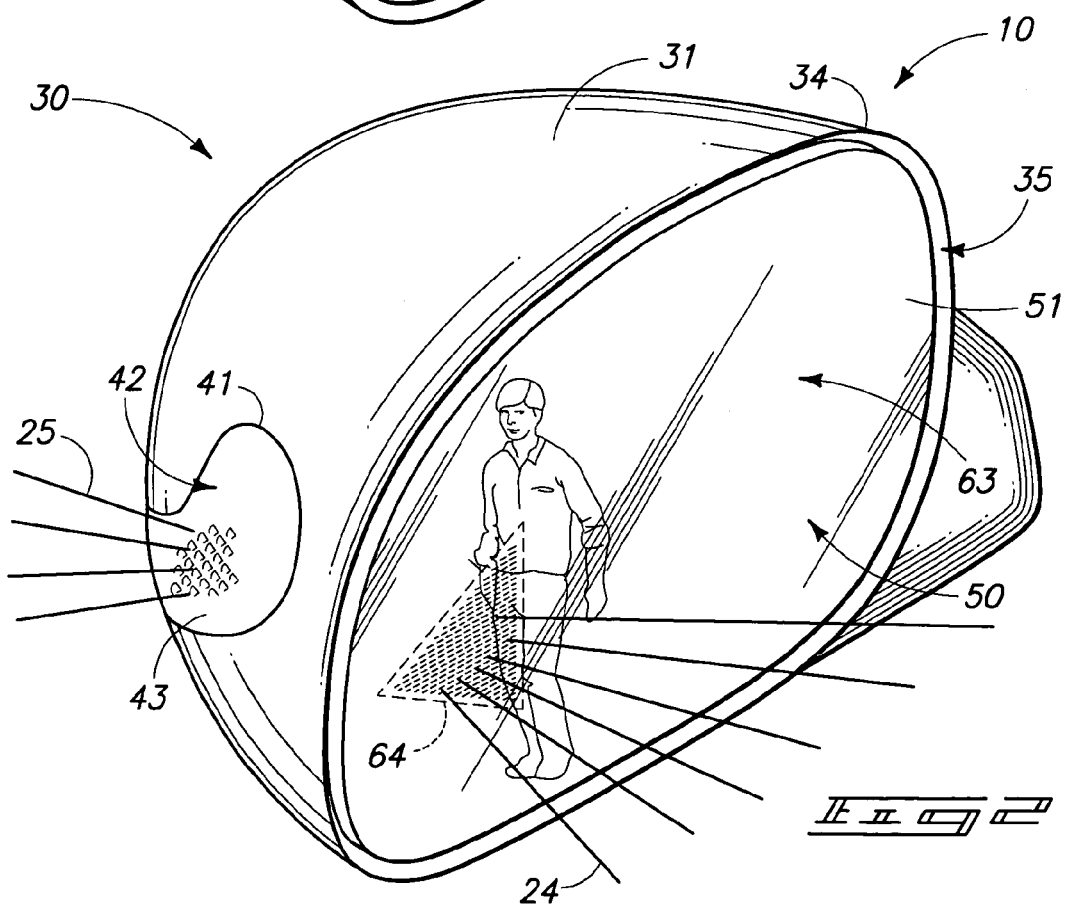

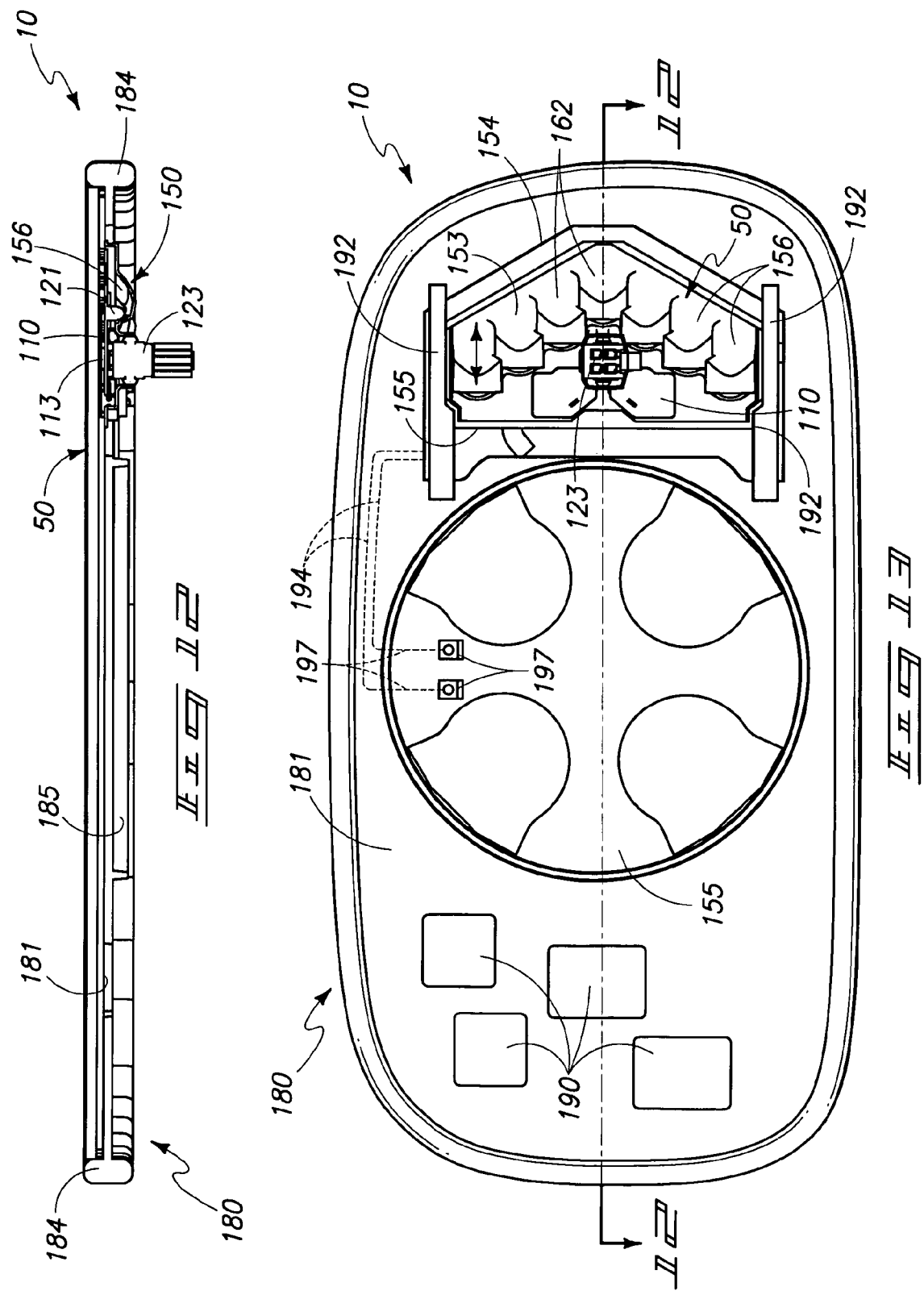

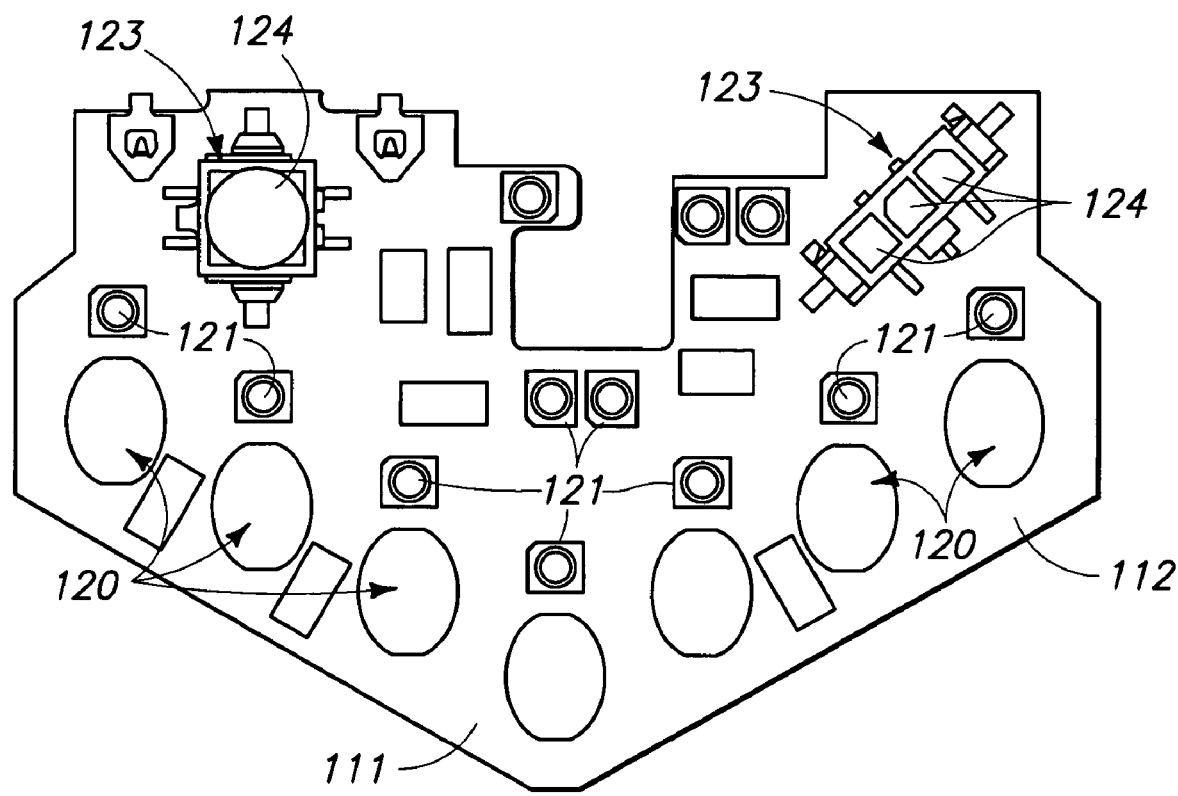

SIGNALING ASSEMBLY

TECHNICAL FIELD

The present invention relates to a signaling assembly which finds usefulness when installed on an overland vehicle, and more specifically to a signaling assembly which when coupled with the controls of an overland vehicle may operate as a combined warning lamp, and rearview mirror, and further provides a visibly discernable signal which can be viewed from a wide range of locations, and is also useful for illuminating a region adjacent to the overland vehicle to assist an operator or passenger when they are entering or departing the vehicle during reduced periods of visibility.

BACKGROUND OF THE INVENTION

The beneficial effects of employing auxiliary signaling assemblies have been disclosed in various U.S. Patents including U.S. Pat. Nos. 6,005,724 and 6,076,948, the teachings of which are incorporated herein. Yet further, numerous designs for signaling assemblies having various types of semitransparent mirrors including dichroic and electrochromic mirrors are disclosed in U.S. Pat. Nos. 5,014,167; 5,207,492; 5,355,284; 5,361,190; 5,481,409; 5,528,422; and 6,749,325 to name but a few. These numerous references are also incorporated by reference herein. Assemblies such as what is shown in U.S. Pat. Nos. 6,005,724 and 6,076,948 have been incorporated into other mirror assemblies such as electrochromic mirror assemblies as more fully shown in U.S. Pat. Nos. 6,512,624 and 6,356,376. These numerous patents are also incorporated by reference herein. The teaching of these patents show that in addition to providing an auxiliary signaling device, such prior art assemblies may also include auxiliary lighting assemblies, which may be remotely actuated, in order to provide an exterior vehicle security light to aid and assist operators and passengers during night time hours. Examples of such assemblies are shown in U.S. Pat. Nos. 5,371,659 and 5,497,305 to name but a few. Additionally, an integral signaling assembly and device for illuminating an area adjacent to an overland vehicle is shown in application Ser. No. 10/741,748, and which was filed on Dec. 18, 2003. This pending application is also incorporated by reference herein.

While many of these prior art assemblies, as discussed above, have operated with a great deal of success and have enjoyed wide commercial acceptance, there are shortcomings with respect to the individual designs which have detracted from their commercial acceptance and perceived usefulness.

In recent years, some automotive platforms have presented challenges to the designers of these types of mirror assemblies in view of the fact that the exterior mirror housing and the space available within the mirror housing, has been reduced in size because of exterior platform design considerations. Consequently, while many of the teachings of the prior art patents work with a good degree of success, they also occupy a rather significant amount of the interior space of the mirror housing in order to be rendered operational. Further, some of these assemblies are very complex in their overall design which increases the cost of manufacturing. Moreover, each of these assemblies requires that an electrical conduit or "pigtail" be extended from same in order to be connected to the electrical system of the overland vehicle. In an exterior mirror application which utilizes an electrochromic mirror which automatically dims, or changes its reflectivity based upon the ambient lighting conditions, it will be understood that to provide a signaling assembly in combination with an electrochromic mirror may result in a tangle of electrical conduits all of which must be routed and connected to an appropriate electrical connector. This confusing array of electrical conduits, creates problems in view of the lack of available space in the housing, and further creates difficulties in the final assembly, manufacture and installation of the product.

Attempts have been made to reduce this complexity by providing various assemblies such as an integral heater and signaling assembly such as seen in U.S. patent application Ser. No. 10/355,915, the teachings of which are incorporated by reference herein. However, these arrangements have been less then ideal inasmuch as the process of affixing, light emitting diodes and other similar assemblies to such integral assemblies have resulted in unduly complex manufacturing processes. This approach has also provided a less then ideal arrangement with respect to the repair and replacement of such assemblies in the event that a subcomponent, such as a light emitting diode, fails during the lifetime of the product.

Therefore, a signaling assembly which addresses these and other shortcomings in the prior art assemblies is the subject matter of the present application.

SUMMARY OF THE INVENTION

One aspect of the present invention relates to a signal assembly which includes a mirror which is operable to both reflect, and pass electromagnetic radiation; a circuit substrate juxtaposed relative to the mirror, and which is operable to pass electromagnetic radiation, and wherein the circuit substrate is releasably electrically coupled with a source of electricity; a first electrically conductive pathway borne by the circuit substrate; a light emitting device borne by the circuit substrate and electrically coupled with the first electrically conductive pathway, and which, when energized, emits visibly discernable electromagnetic radiation which passes by each of the circuit substrate and the mirror; and a second electrically conductive pathway borne by the circuit substrate and which is electrically coupled with an electrically actuated assembly, and wherein the electrically actuated assembly is coupled to the source of electricity by way of the circuit substrate.

Another aspect of the present invention relates to a signal assembly which includes a semitransparent mirror having a first and a second surface; an electrically actuated heater disposed in heat transferring relation relative to the second surface of the mirror, and wherein the heater defines a first region through which electromagnetic radiation may pass; a circuit substrate juxtaposed relative to the heater, and wherein the circuit substrate defines a second region through which electromagnetic radiation may pass, and wherein the first and second regions are substantially aligned; a first electrical pathway borne by the circuit substrate, and which is releasably electrically coupled with a source of electricity; a light emitting device borne by the circuit substrate, and which is electrically coupled with the first electrical pathway, and wherein the light emitting device, when energized, by the source of electricity, emits visibly discernable electromagnetic radiation which is reflected, at least in part, through the first and second regions; and a second electrical pathway, borne by the circuit substrate, and electrically coupled to the heater, and the source of electricity, and wherein the heater is energized by the source of electricity passing through the second electrical pathway.

Yet further another aspect of the present invention relates to a signal assembly for an overland vehicle, and which includes a mirror housing which is borne by the overland vehicle, and which is defined by a sidewall, and wherein the sidewall further defines a cavity which communicates with a mirror aperture; a semitransparent mirror which is operable to simultaneously pass and reflect, visibly discernable electromagnetic radiation, and wherein the semitransparent mirror substantially occludes the mirror aperture; an electrically actuated heater positioned in the cavity of the housing, and disposed in juxtaposed heat transferring relation relative to the semitransparent mirror, and wherein the heater defines a first region through which visibly discernable electromagnetic radiation may pass; a circuit substrate positioned in juxtaposed relation relative to the heater, and further defining a second region through which visibly discernable electromagnetic radiation may pass, and wherein the first and second regions are substantially aligned; an electrical coupler borne by the circuit substrate and which is configured to releasably electrically couple with a source of electricity which is provided by the overland vehicle; a first electrical pathway borne by the circuit substrate and electrically coupled to the electrical coupler; a light emitting device borne by the circuit substrate and positioned in spaced relation relative to the first and second regions, and wherein the light emitting device, when energized, by the source of electricity, emits visibly discernable electromagnetic radiation which passes out of the mirror housing and forms a visibly discernable signal; a second electrical pathway borne by the circuit substrate, and which is electrically coupled with the electrical coupler and with the heater, and wherein the heater is energized through the circuit substrate; a reflector disposed in reflecting relation relative to the light emitting device, and which is operable to direct the emitted visibly discernable electromagnetic radiation, at least in part, through the first and second regions; and a mirror mounting plate which is operable to matingly receive, at least in part, a portion of the semitransparent mirror.

These and other aspects of the present invention will be discussed in greater detail hereinafter.

BRIEF DESCRIPTION OF THE DRAWINGS

Preferred embodiments of the invention are described below with reference to the following accompanying drawings.

FIG. 1 is a perspective, front elevation view of a signal assembly of the present invention in a deenergized state. The view shows some surfaces removed to illustrate the structure thereunder.

FIG. 2 is a perspective, front elevation view of the signal assembly of FIG. 1 shown in an energized state.

FIG. 12 is a partial, transverse vertical sectional view of one form of a signal assembly of the present invention and which is taken from a position along line 12-12 of FIG. 13.

FIG. 13 is a partial, side elevation view of one form of the signal assembly of the present invention.

FIG. 17 is an enlarged, plan view of a third form of a circuit substrate which is employed in another form of the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 3:
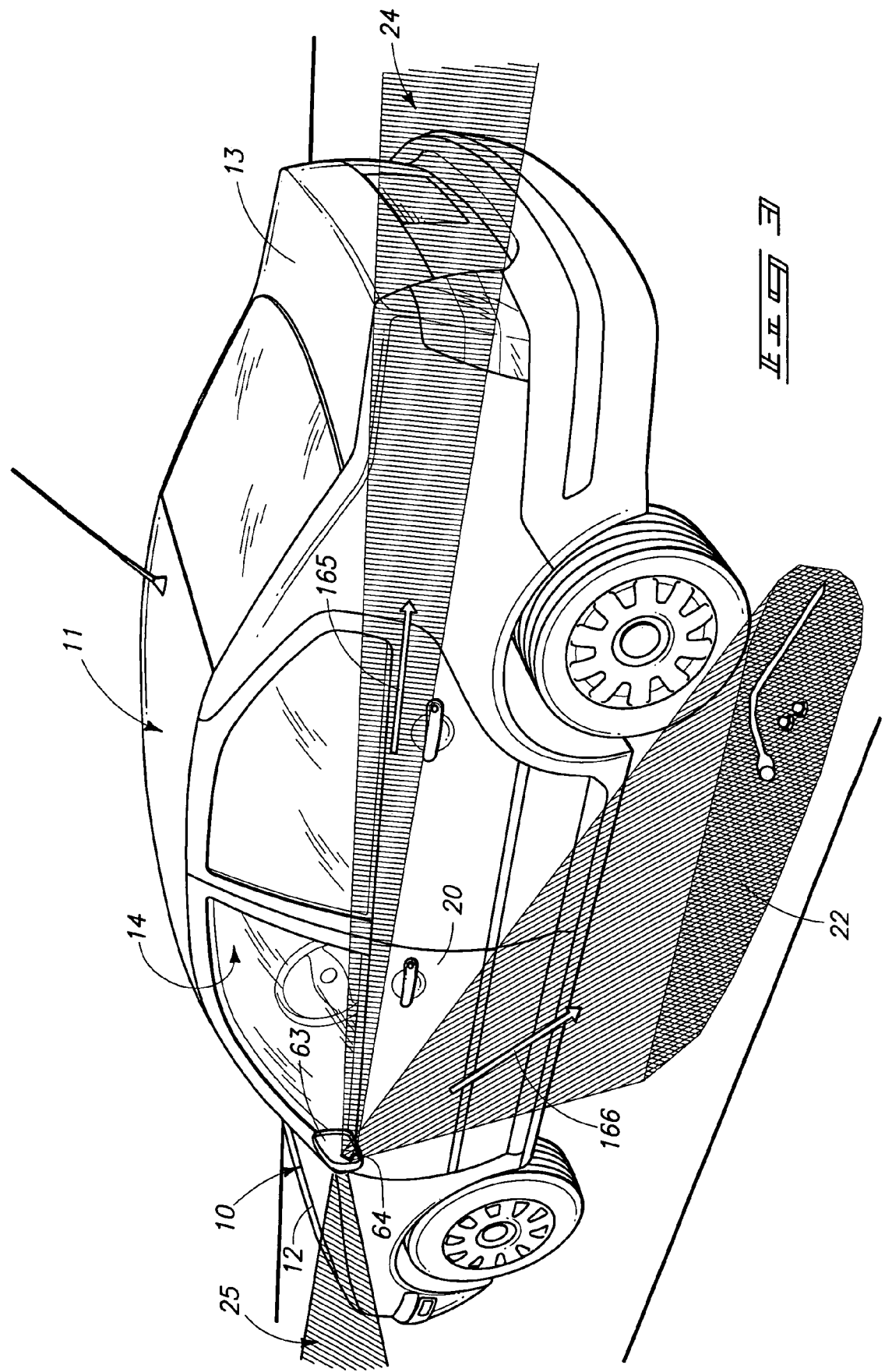
FIG. 3 is perspective, side elevation view of an overland vehicle of conventional design, and which illustrates the approximate projected patterns of visible electromagnetic radiation provided by the signal assembly of the present invention.

A signaling assembly which incorporates the teachings of the present invention is best seen by reference to the numeral 10 in FIG. 1 and following. As was briefly discussed above, the present invention finds usefulness when installed on an overland vehicle 11, of conventional design, and which is best seen by reference to FIGS. 3 and 4. As shown therein, the overland vehicle has a forward or front end 12; an opposite or rear end 13, and an operator's position 14. From the operator's position 14, various signaling lamps 15 can be selectively energized in order to provide visual information to adjoining drivers regarding the intended directional movement of the overland vehicle 11 as it proceeds along a course of travel. As seen more specifically by reference to FIG. 3, the apparatus or assembly 10 is mounted on or near the door 20 of the overland vehicle such that a portion of one side of same (FIG. 4) can be viewed from the operator's position 14. As seen more specifically by reference to FIG. 3, the apparatus or assembly 10 may be rendered operable in one form to selectively illuminate an area 22 adjacent to the side 21 of the vehicle 11 to provide, on the one hand, security during reduced hours of visibility, or further, illuminate the same region for other purposes. As seen in FIG. 3, the apparatus or assembly 10 also provides a visual signal which includes a rearward component 24 and a forward component 25. These visual signals can be seen through a wide range of positions relative to the overland vehicle 11 as seen by reference to FIG. 4. As seen more specifically by reference to FIG. 1, the apparatus or assembly 10 includes a housing which is generally indicated by the numeral 30. The housing 30 is formed of a generally opaque convexly curved sidewall 31, although other shapes of the sidewall could work with equal success. The convexly curved sidewall 31 has a first side 32 and an opposite second side 33. As seen in FIG. 1, the sidewall 31 is defined by a first peripheral edge 34. This peripheral edge defines a first aperture 35. As further understood by a study of FIG. 1, the second or inside facing surface 32 of the curved sidewall 30 defines a cavity 40 which receives various components which will be discussed in greater detail hereinafter. Still further, the housing 30 defines a second peripheral edge 41. This second peripheral edge defines a second aperture 42. As seen in FIGS. 1 and 2, a translucent lens 43 substantially occludes the second aperture for the purposes which will be described, hereinafter.

As best seen by reference to FIGS. 1, 2 and 5-7, a semitransparent mirror 50 is received or otherwise supported in moveable, substantially occluding relation relative to the first aperture 35 which is defined by the housing 30. The semitransparent mirror 50 has a first or outwardly facing surface 51 which faces away from the cavity 40, and a second or inwardly facing surface 52 which faces inwardly toward the cavity 40. As best understood by the greatly simplified and exaggerated views of FIGS. 5-7, the semitransparent mirror 50 is fabricated from a light transmissible substrate 53 which has opposite first, and second surfaces, 54 and 55, respectively.

Figure 5:
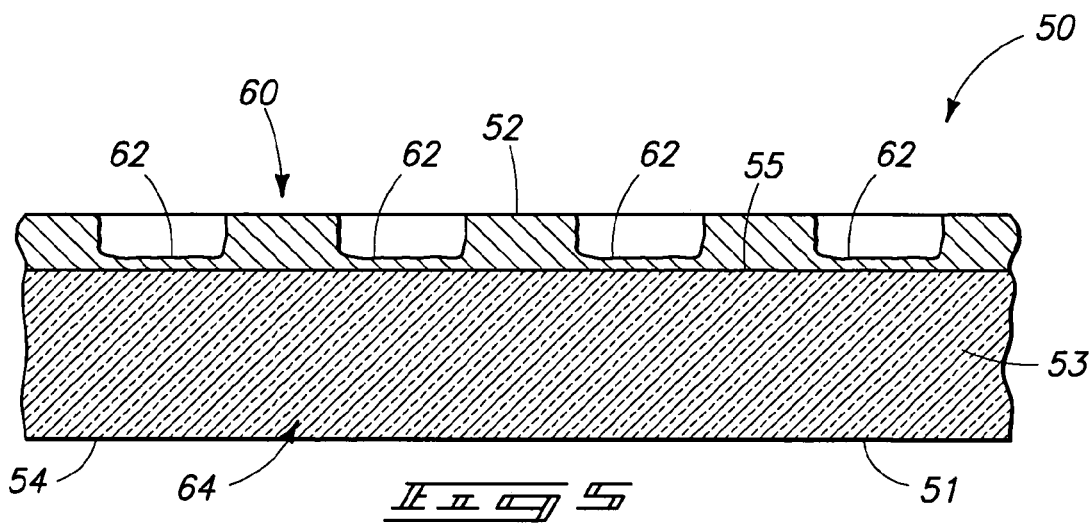
FIG. 5 is a greatly enlarged, partial, vertical sectional view of a first form of a semitransparent mirror which may be employed in the present invention and which is taken along the line 5-5 of FIG. 1.
Figure 6:
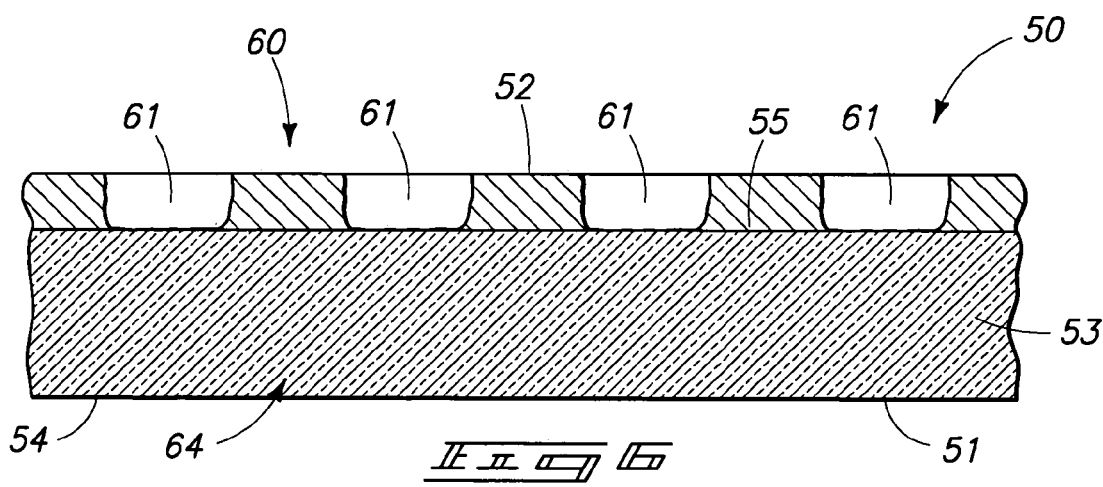
FIG. 6 is a greatly enlarged, vertical, sectional view of a second form of a semitransparent mirror which may be employed in the present invention, and which is taken from a position along line 5-5 of FIG. 1.
Figure 7:
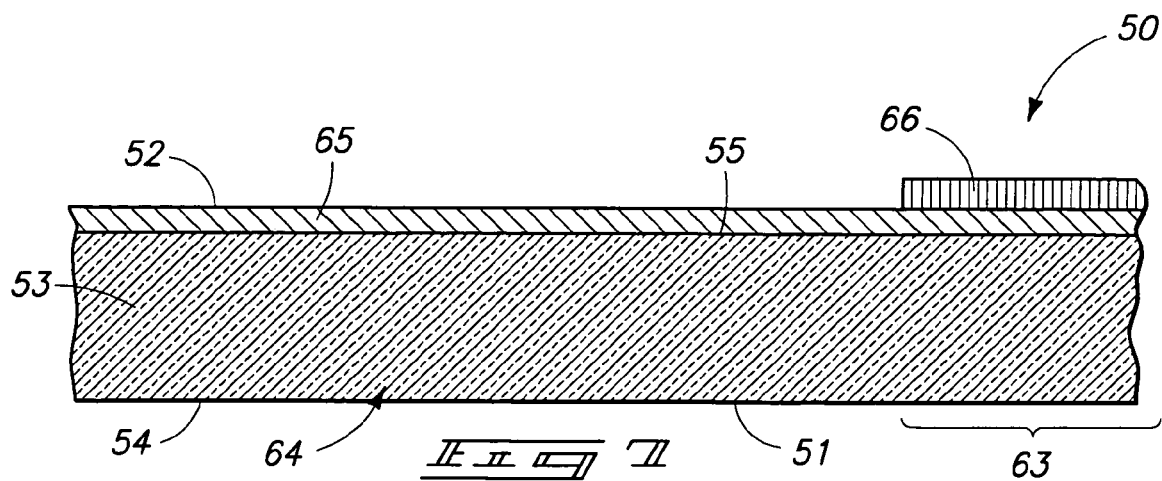
FIG. 7 is a greatly enlarged, vertical sectional view taken through a third form of the semitransparent mirror and which illustrates yet another, alternative form of the present invention.

Referring still to FIGS. 5-7, a reflective layer, which is generally indicated by the numeral 60, is positioned in at least partial covering relation relative to one of the first or second surfaces 54 or 55 of the semitransparent mirror 50. As should be understood, the location of the reflective layer on either one of these two surfaces will not meaningfully effect the operation of the present invention. As seen in FIGS. 5-7, which are greatly exaggerated views of several alternative forms of semitransparent mirrors which find usefulness in the present invention, the reflective coating or layer 60 is positioned on the second or inwardly facing surface 55. The reflective layer 60 provides a highly reflective surface which reflects ambient, visibly discernable electromagnetic radiation of various wavelengths. The reflective layer 60 may comprise a layer of chromium (FIGS. 5 and 6) which is deposited to a thickness which typically passes less than about 6% of ambient visibly discernable electromagnetic radiation. Although, it should be understood that this percentage may vary based upon quality control procedures employed in the manufacturing process. As seen in the drawings, and more specifically in FIG. 6, discreet apertures 61 may be individually formed in a layer of chromium which permits the passage of electromagnetic radiation therethrough. The individual apertures 61 may be formed in various sizes and shapes in order to achieve the benefits as will be described hereinafter. Still further, and as seen in FIG. 7, the reflective layer 60 may comprise a substantially continuous dichroic coating 65 which is operable to pass a predetermined band of electromagnetic radiation. The dichroic coating may similarly be applied to one of the first or second surfaces 54 and 55, respectively. Assuming that a dichroic coating 65 is utilized as the reflective layer 60, the requirement for forming or defining an aperture, or plurality of apertures 61 (FIGS. 5 and 6) is not normally necessary in view of the optical characteristics of the dichroic coating. The use of dichroic coatings in connection with various signaling assemblies are discussed in greater detail in U.S. Pat. Nos. 5,014,167 and 5,207,492 both of which are incorporated by reference herein.

In still another alternative form of the invention, and as see in FIG. 5, the reflective layer 60, which typically comprises chromium, may be deposited to a given reduced thickness 62 which permits the passage of increasing amounts of electromagnetic radiation therethrough. Such a reflective layer is typically referred to as "thin chrome." Those skilled in the art are readily capable of calculating the thickness of the chromium which must be deposited in order to form a reflective layer 60 which passes the desired amounts of visibly discernable electromagnetic radiation.

In a further alternative form of the invention, and as best seen in FIGS. 1 and 2, the reflective layer 60 may be deposited on the light transmissible substrate 53 in a manner to form two portions or regions, that is, a first portion or region 63 comprising chromium or a reflective coating which is deposited to a thickness which passes less than about 6% of ambient visibly discernable electromagnetic radiation; and a second portion or region 64 which is adjacent to the first portion, and which is surrounded by a broken line in that figure, and which passes electromagnetic radiation in amounts greater than about 6%. In the several forms of the invention 10, the semitransparent mirror 50, which is chosen to substantially occlude the first aperture 35, is operable to simultaneously reflect visibly discernable electromagnetic radiation, and pass electromagnetic radiation for the purposes which are described below. As seen by reference to FIGS. 1, 2, 5 and 6, the semitransparent mirror 50 may be manufactured in a fashion to form apertures 61 in given patterns. The light emitting apertures 61 are formed in the secondary region 64 by removing the reflective coating or layer 60. As seen, and as discussed above, the secondary region may be continuous or discontinuous. The specific details of forming the primary and secondary regions 63 and 64 are set forth in greater detail in U.S. Pat. No. 6,005,724, the teachings of which are incorporated by reference herein.

Referring now to FIG. 7, and as discussed briefly above, another form of a semitransparent mirror 50 which is useful in the invention 10, may utilize a dichroic mirror coating 65. The usefulness of a dichroic mirror as earlier discussed has been disclosed in various U.S. Patents. A dichroic mirror coating 65 which is useful with such semitransparent mirrors 50 is also well known in the art and further discussions regarding these dichroic mirror coatings is not warranted. As seen in FIG. 7, a substantially opaque masking layer 66 is applied over the primary or first region 63, thereby making the primary region substantially opaque and further permitting visibly discernable electromagnetic radiation to pass through the secondary region 64 which is unmasked. As discussed in several of the earlier prior art patents, the dichroic mirror coatings 65 may be selected to pass given bands of visibly discernable electromagnetic radiation in greater amounts than other bands of electromagnetic radiation thereby making the resulting semitransparent mirror 50, on average, an acceptable reflector of visibly discernable electromagnetic radiation, while simultaneously allowing increased amounts of electromagnetic radiation of the selected band of electromagnetic radiation to pass therethrough. For purposes of the present application, a dichroic coating 66 is any coating, regardless of the chemical composition, and which is operable to pass a given band of electromagnetic radiation in greater amounts than other bands of electromagnetic radiation.

Figure 16:
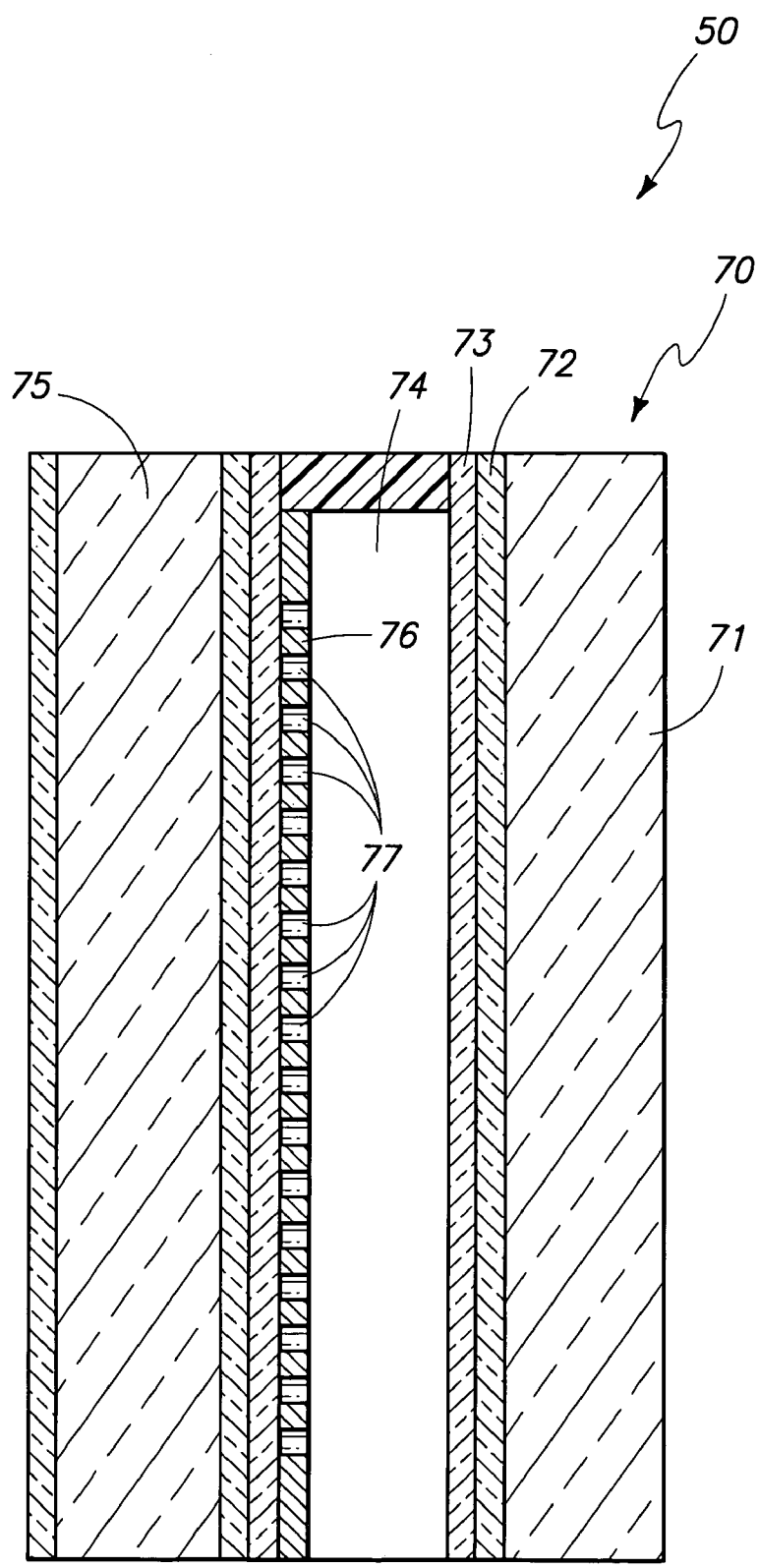
FIG. 16 is a greatly, simplified, and enlarged transverse, vertical sectional view taken through a prior art semitransparent electrochromic mirror, and which might find usefulness in the present invention.

Yet a further form of an acceptable semitransparent mirror 50 which may be employed in the present invention 10 is seen in FIG. 16, and which illustrates a prior art arrangement for a signaling assembly which incorporates an electrochromic mirror which is generally indicated by the numeral 70. The electrochromic mirror 70 includes a front or transparent element or substrate 71, and which has applied to its rearwardly facing surface a transparent electrically conductive material 72, and a layer of color suppression material which is generally indicated by the numeral 73. In the arrangement as seen in FIG. 16, an electrochromic fluid or gel 74 is provided, and which is sandwiched between the front element 71 and a rear element 75 which is also transparent. As seen in FIG. 16, a conductive thin film reflector/electrode 76 is positioned in spaced relation relative to the front element 71. Still further, a plurality of apertures 77 are formed in this conductive film, electrode 77 and which will permit the passage of visibly discernable electromagnetic radiation therethrough forming the rearward signal component 24, as earlier described. As will be discussed, hereinafter, a light source is provided, and which is disposed in an orientation relative to the electrochromic mirror 70 such that when the light source is energized, the visibly discernable electromagnetic radiation may be oriented to pass through the plurality of apertures 77. Various arrangements for forming a signaling assembly with an electrochromic element 70 are described in U.S. Pat. Nos. 6,257,746 and 6,512,624 the teachings of which are incorporated by reference herein.

Figure 8:
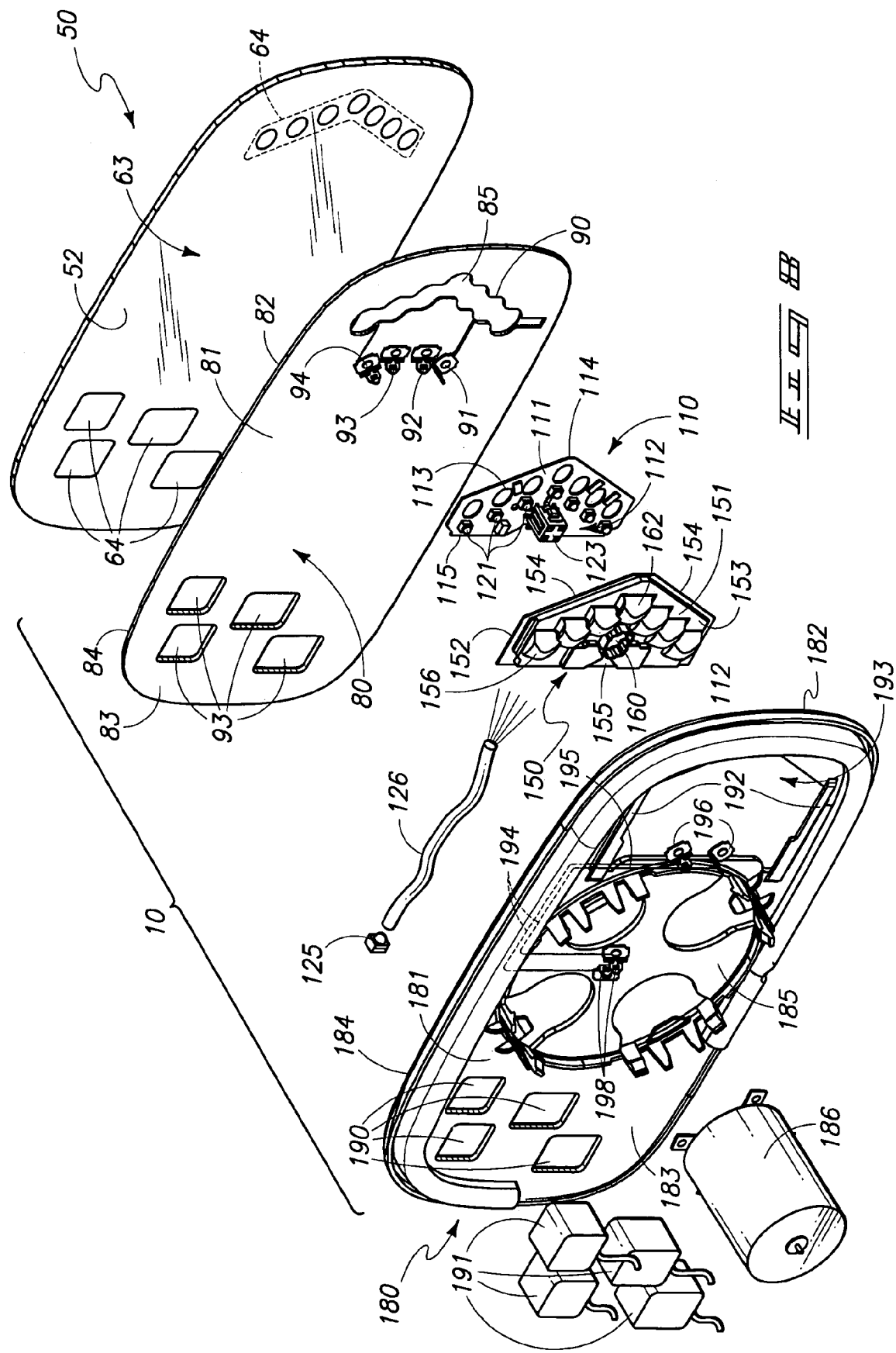
FIG. 8 is a partial, perspective, exploded view of a first form of the signal assembly of the present invention.

Referring now to FIG. 8, the present invention 10 includes a heater which is generally indicated by the numeral 80, and which is positioned in juxtaposed heat transferring relation relative to the inwardly facing surface 52 of the semitransparent mirror 50. The heater 80, is made integral with a heater substrate 81, and which has a first surface 82 which is typically affixed by an adhesive to the inwardly facing surface 52 of the semitransparent mirror 50. Still further, the heater substrate 81 has a second surface 83 which faces inwardly towards the cavity 40. In some forms of the invention, a layer of adhesive may be applied to this inwardly facing surface, not shown. The heater 80 is defined by a peripheral edge 84. Still further, a region which passes electromagnetic radiation 85 is formed in a given shape therein. As seen, this region 85 is substantially aligned with the second portion or region 64 of the semitransparent mirror 50 which passes electromagnetic radiation. The region 85 which passes electromagnetic radiation, as defined by the heater substrate 81, is defined by a peripheral edge which is generally indicated by the numeral 90. The peripheral edge can define assorted different shapes.

Figure 9:
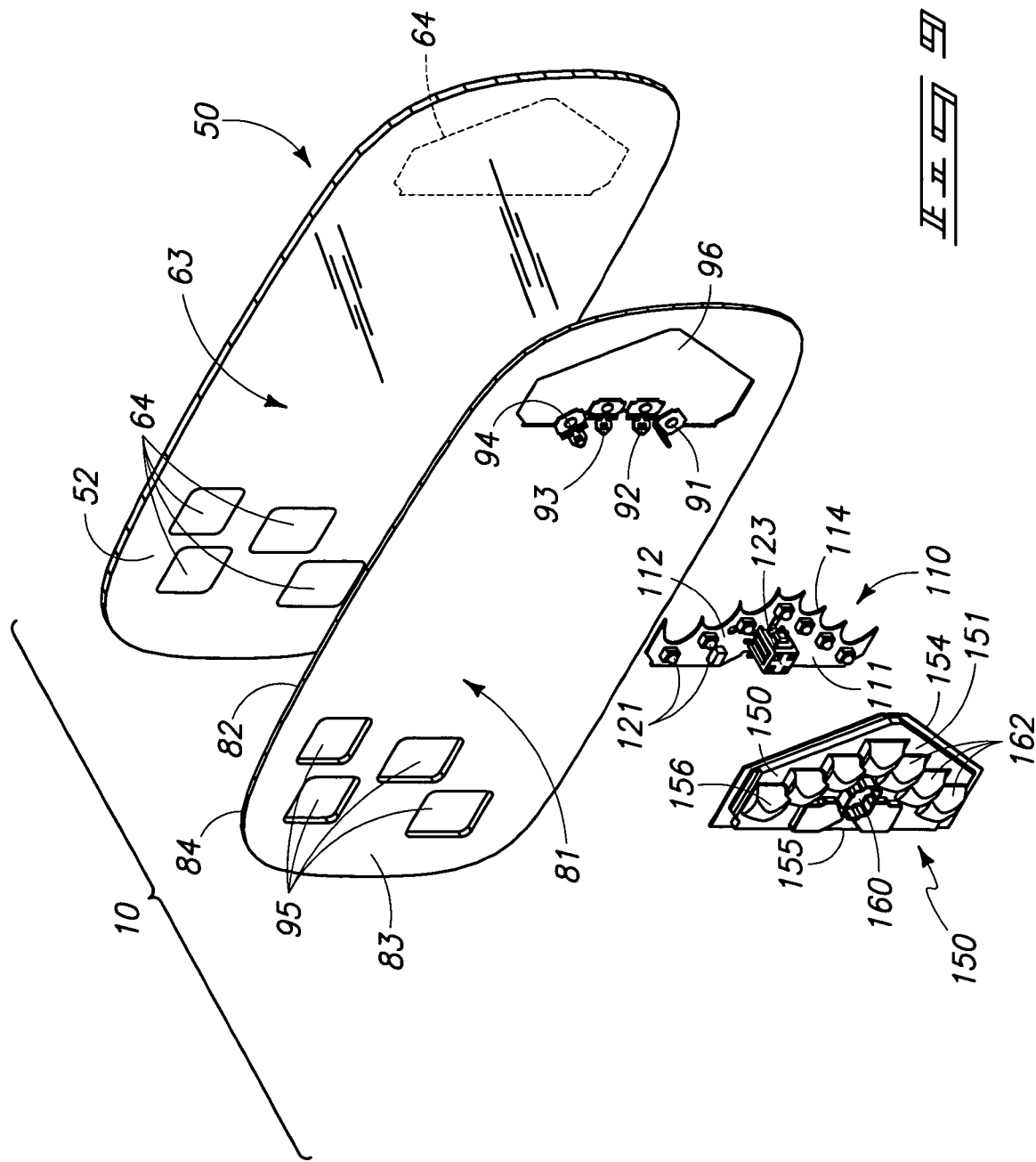
FIG. 9 is a partial, perspective, exploded view of a second possible form of the present invention.

As a general matter however, the peripheral edge 90 generally forms a wedge shaped arrow. As seen in FIGS. 8 and 9, first, second, third and fourth electrical connectors 91-94 are individually mounted on the heater substrate 81, and are operable to deliver a source of electrical power from the overland vehicle 11, to the heater elements (not shown) but which are embedded in the heater substrate 81. The electricity delivered by means of the respective electrical conductors causes the heater substrate 81 to increase in temperature, thereby warming or increasing the temperature of the semitransparent mirror 50. This heat is typically effective in removing frost, snow, water vapor, dew and the like which may become deposited on the first surface 51 of the mirror 50 due to various changing weather conditions.

Referring still to FIG. 8, a plurality of discrete windows 95 may be formed in a given pattern in the heater element and which substantially align with other apertures which are formed in the mirror mounting plate which will be discussed in greater detail hereinafter. These individual discrete windows are operable to receive or pass emitted electromagnetic radiation that may be generated, for example, by a wide variety of sensors, gauges and the like, which will be discussed below. These devices are operable, in some arrangements, to provide information which may be relevant, or of interest, to the operator of the overland vehicle 11. In still another form of the invention as seen in FIG. 9, the region 94 which passes electromagnetic radiation may be formed in various shapes including the form of a circuit substrate, which will be discussed, below. In this form of the invention, the region which passes electromagnetic radiation 96 is operable to matingly receive a circuit substrate having a given shape such that the circuit substrate is matingly received, or nests within the region 96.

Figure 10:
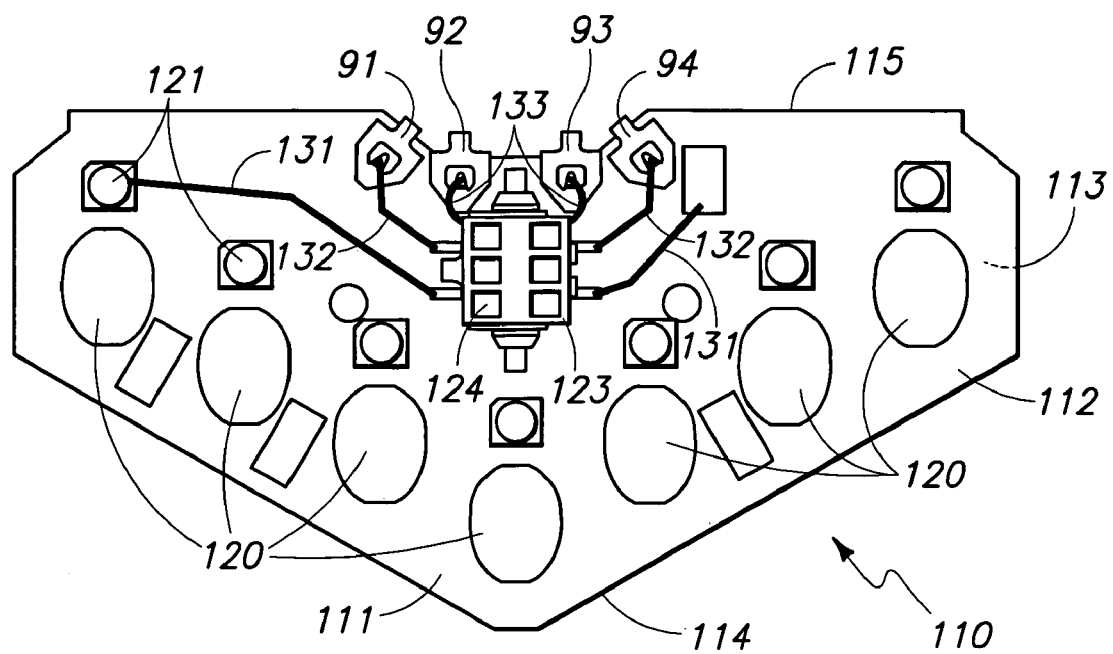
FIG. 10 is an enlarged, plan view of a circuit substrate which is employed in one form of the present invention.
Figure 11:
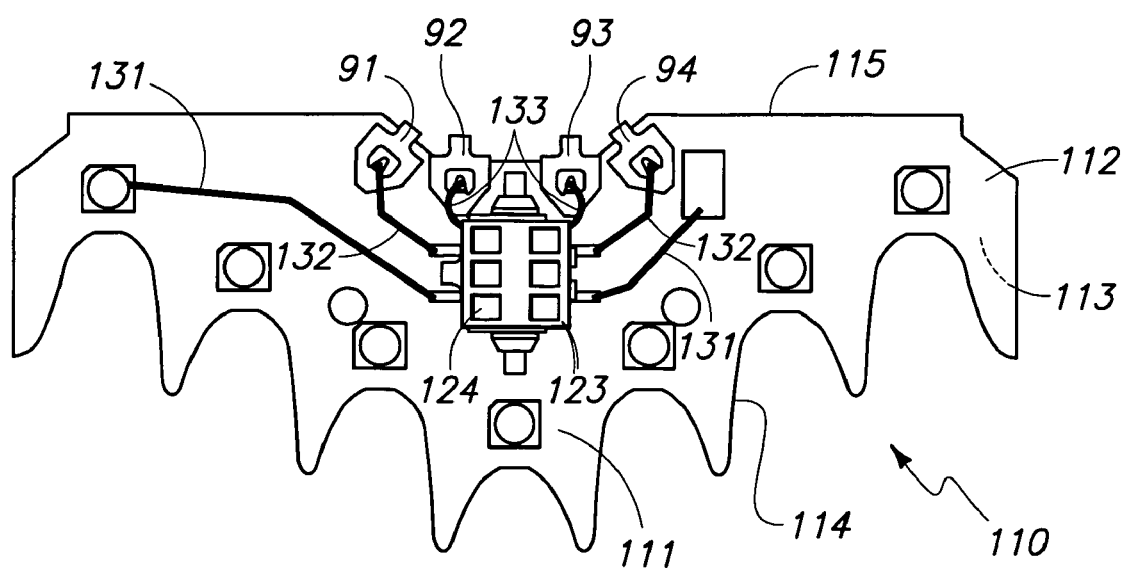
FIG. 11 is an enlarged, plan view of a second form of a circuit substrate which is employed in another form of the present invention.

The signaling assembly 10 of the present invention includes a circuit substrate which is generally indicated by the numeral 110, and which is best seen by reference to FIGS. 8-11 and 17, respectively. The circuit substrate 110 is typically fabricated from an opaque electrically insulative, and somewhat flexible material. The circuit substrate 110 has a main body 111 which has a top surface 112 and a bottom surface 113. The bottom surface 113 as seen in FIG. 8, rests in juxtaposed relation thereagainst the heater 80. In one form of the invention, the circuit substrate is affixed to the heater by means of an adhesive layer which is positioned therebetween the bottom surface 113 and the heater 80. In an alternative form of the invention and as seen in FIG. 9, the circuit substrate 110 may be juxtaposed relative to the heater, and received in a region such as 96. In this arrangement the main body 111 would also be juxtaposed thereagainst the semitransparent mirror 50. The main body 111 of the circuit substrate 110 has a first peripheral edge 114, and an opposite, second peripheral edge 115, respectively. While the main body 111 has a somewhat pointed, or pentagon shaped configuration, other shapes would work with equal success. As seen in FIG. 10, a plurality of apertures 120 are defined by the main body 111 and are disposed in a given pattern, and are positioned adjacent to the first peripheral edge 114. These apertures permit electromagnetic radiation to pass therethrough for the purposes which will be described hereinafter. In an alternative form of the invention, as seen in FIG. 11, it will be seen that the first peripheral edge 114 has a somewhat scalloped appearance and electromagnetic radiation passes, at least in part, by the first peripheral edge 114.

Figure 4:
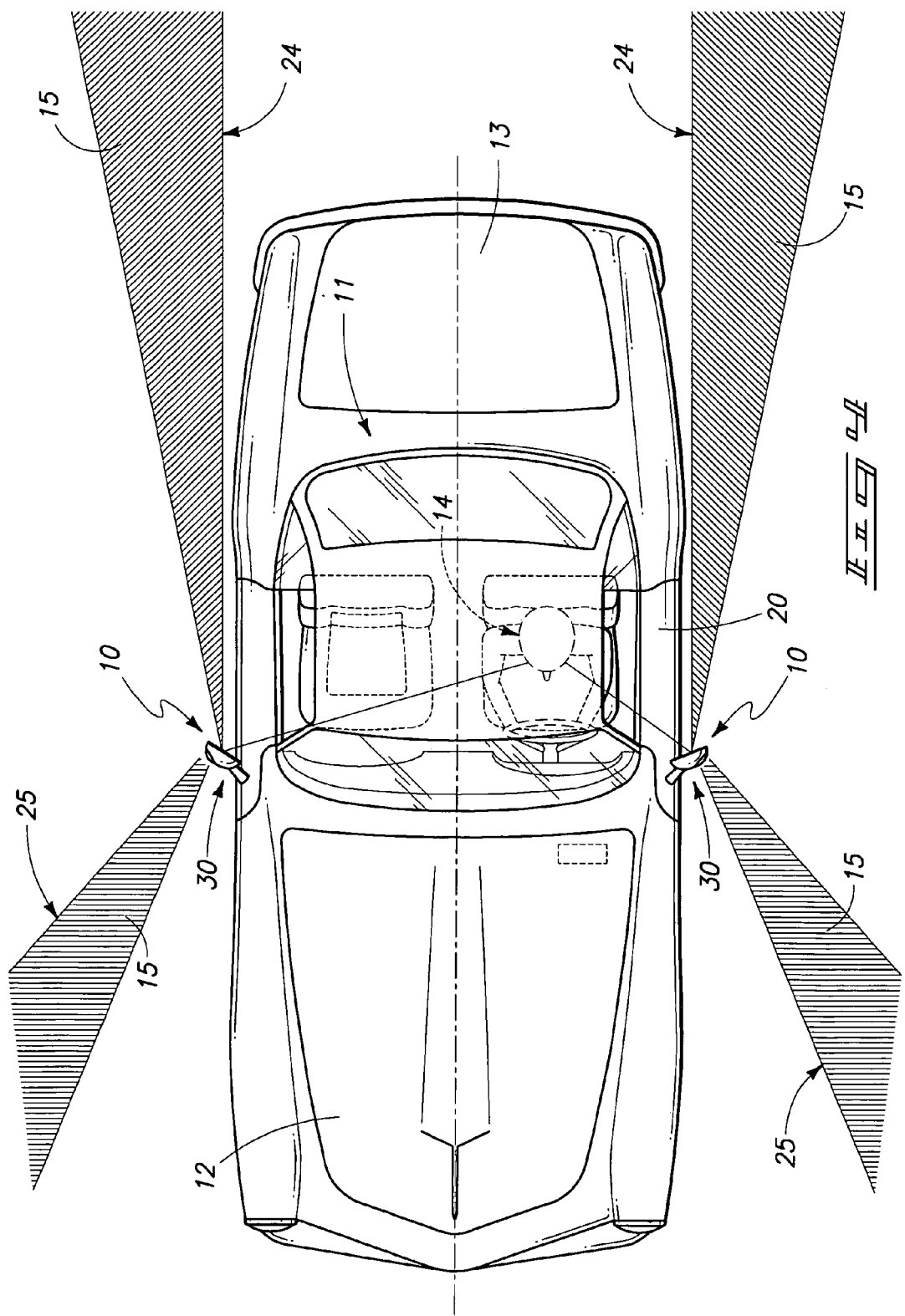
FIG. 4 is a plan view of an overland vehicle of conventional design, and which illustrates some of the projected patterns of visible electromagnetic radiation provided by the signal assembly of the present invention.

As seen in FIGS. 8-11 and 17, a plurality of light emitting devices such as light emitting diodes 121 are located in adjacent spaced relation relative to the respective apertures 120. These particular light emitting diodes are typically serially electrically coupled together, although in other forms of the invention, as will be described below, the individual light emitting diodes 121 may be separately energized or energized in groups to create different patterns of emitted radiation such as seen in FIGS. 3 and 4, respectively. As should be understood, when energized, the individual light emitting devices 121 are operable to emit electromagnetic radiation, typically in a visible band, and which is reflected, as will be discussed hereinafter in a manner such that the emitted electromagnetic radiation passes, at least in part, through the respective apertures 120 or by the peripheral edge 114 and is operable to pass through the semitransparent mirror 50. As should be understood, the apertures 120, or peripheral edge 114 as seen in FIG. 11, are oriented in substantial alignment with the second portion or region 64 of the semitransparent mirror 50 which passes electromagnetic radiation.

Figure 15:
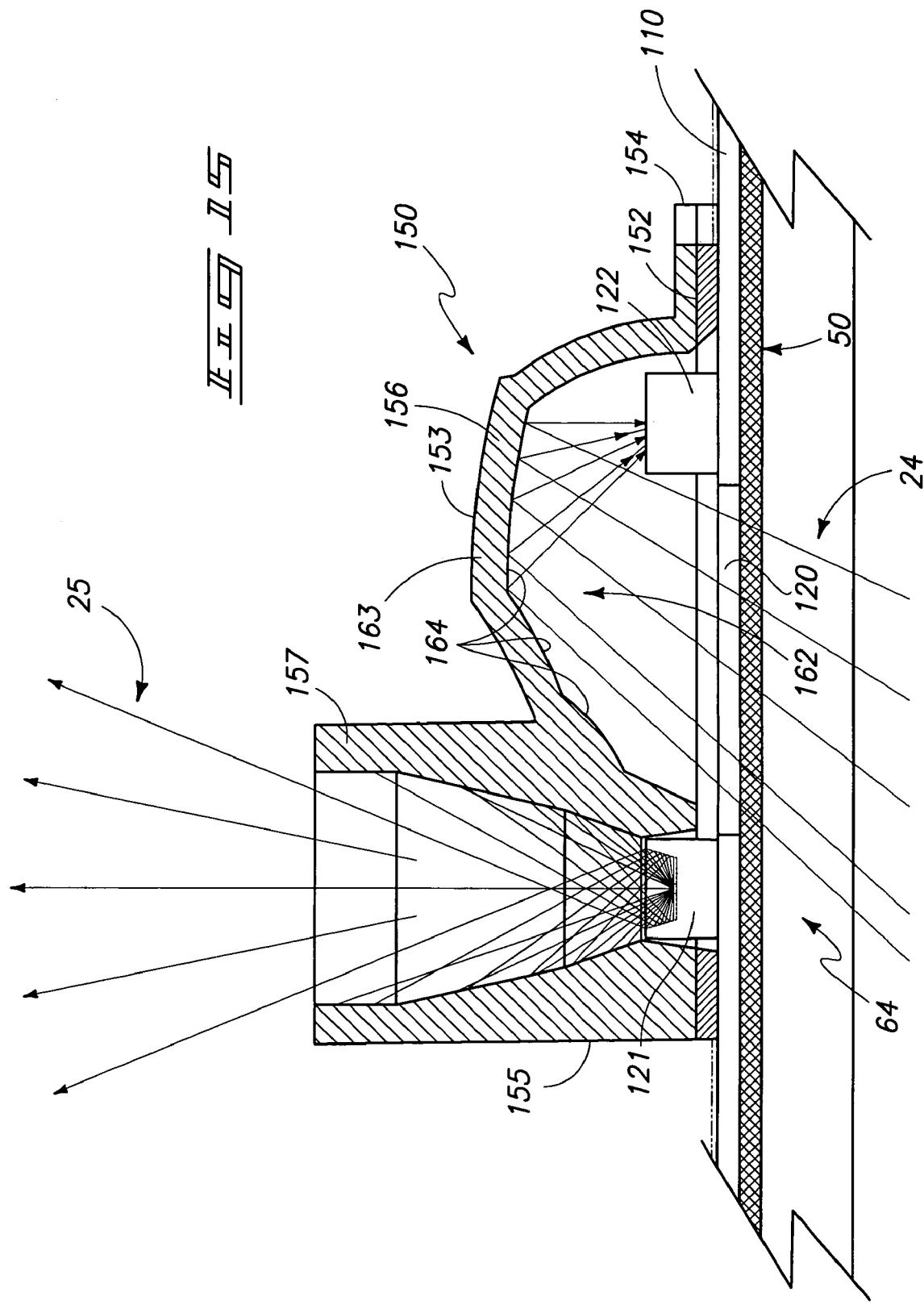
FIG. 15 is a greatly enlarged, transverse vertical sectional view of one form of the signal assembly of the present invention and which shows another inventive aspect of the present invention.

As best appreciated by a study of FIG. 15, and in another form of the invention, in place of one of the plurality of light emitting devices 121, a receiver of electromagnetic radiation 122 may be affixed to, and electrically coupled with the circuit substrate 110. The receiver of electromagnetic radiation is operable to provide an electrical signal when exposed to electromagnetic radiation of a given wavelength. This arrangement is useful for such applications as near object detection and other similar arrangements whereby devices employed for such purposes typically utilize or receive electromagnetic radiation in the invisible bands.

As seen in FIGS. 10 and 11 and 17, a female electrical coupler 123 is borne by or otherwise mounted on the top surface 112 of the circuit substrate 110. This female electrical coupler is well known in the art and defines a receiving aperture 124 which releasably matingly couples with a male electrical coupler. The electrical coupler 123 is electrically coupled with a source of electricity which is typically provided by the overland vehicle 11. In yet a further alternative arrangement, and as seen in FIG. 8, a source of emitted electromagnetic radiation from a device such as a remotely positioned light emitting diode, or other emitter 125 may be provided. The emitted radiation from the emitter 125 may be delivered to the signal assembly 10 by means of a fiber optic cable, fiber optic assembly, and/or a light pipe 126. It should be understood that two or more electrical couplers 123 may be mounted on the circuit substrate 110 depending upon the needs of the signal assembly 10 as seen in FIG. 17.

As seen most clearly in FIGS. 10 and 11, a first electrically conductive pathway 131 is borne by the circuit substrate 110, and is electrically coupled to the plurality of light emitting devices 121. As earlier discussed, the light emitting devices are typically electrically coupled together in a serial arrangement, however, individual, or groups of light emitting devices may be energized for particular purposes. Still further, a second electrically conductive pathway 132 is borne by the circuit substrate 110, and is also electrically coupled to the electrical coupler 123. Further, a third electrically conductive pathway 133 is borne by the circuit substrate and similarly is electrically coupled to the electrical coupler 123. As seen in FIGS. 10 and 11, the first, second, third and fourth electrical contacts 91-94, respectively are electrically coupled to the main body 111 of the circuit substrate 110, and are individually located in a position which is near the second peripheral edge 115 when the circuit substrate is properly and fully assembled. In FIGS. 10 and 11, the electrical contacts 91-94 are illustrated as being electrically coupled to the circuit substrate 110. As illustrated, the second electrically conductive pathway 132 is electrically connected to the first and fourth electrical contacts 91 and 94, and the third electrically conductive pathway 133 is electrically connected to the second and third electrical contacts 92 and 93, respectively. As will be discussed in greater detail hereinafter, the second electrically conductive pathway 132 is operable to supply electrical energy which is used to energize the heater 80. As earlier discussed, the heater 80, when energized, emits heat energy which is imparted to the semitransparent mirror 50 to maintain the mirror in a useful condition during inclement weather or reduced temperatures. Still further, the third electrically conductive pathway 133 which is electrically coupled to the second and third electrical contacts 92 and 93, respectively, is operable to supply electrical power for energizing and/or controlling an electrochromic mirror element 70 which might be employed in certain forms of the invention, as earlier disclosed. When the present application is used in this form, the electrochromic element 70 is electrically coupled to the heater, and receives electrical power to energize or control the operation of same by means of the third electrical pathway 133.

Figure 14:
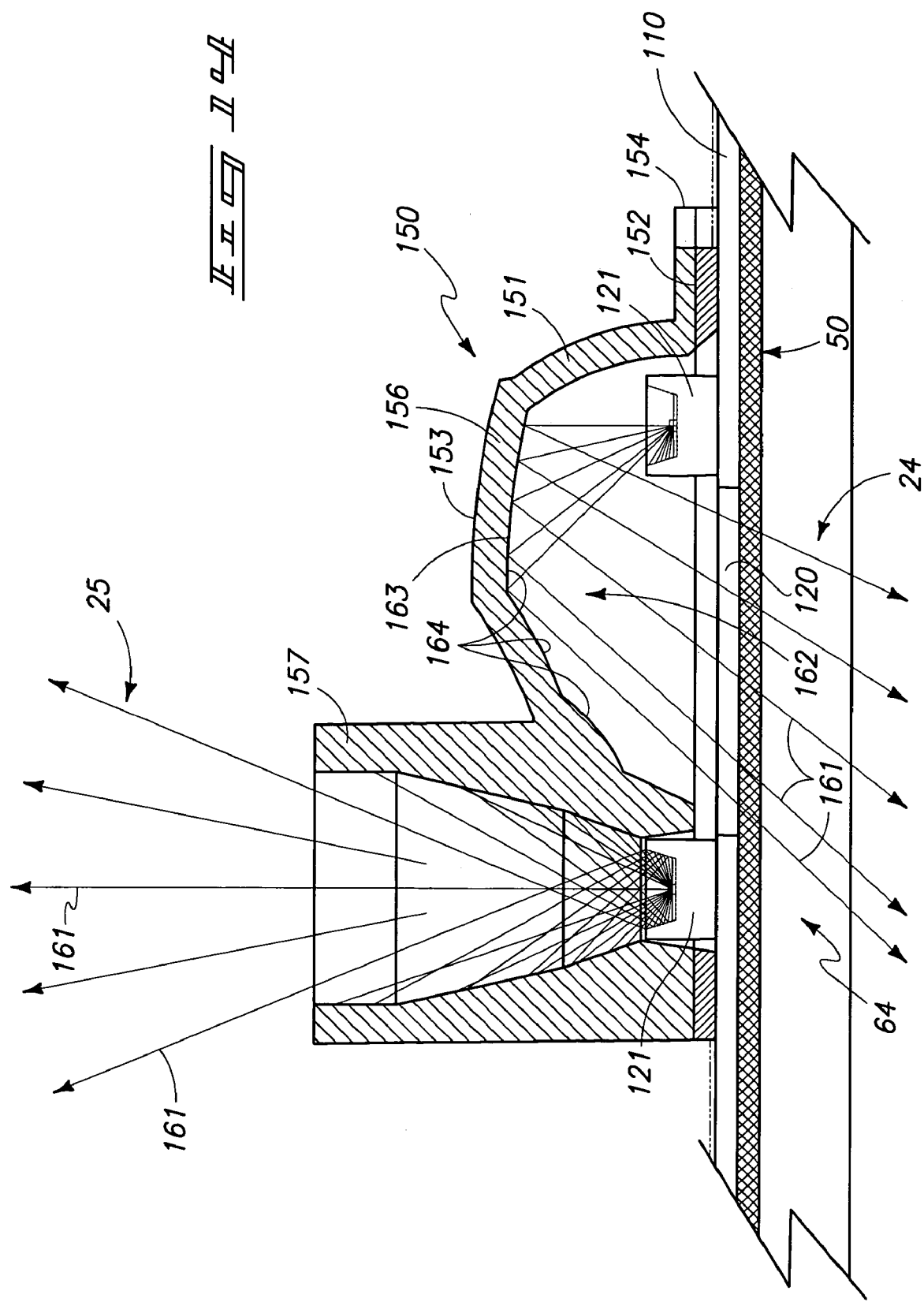
FIG. 14 is a greatly enlarged, transverse vertical sectional view of one form of the signal assembly of the present invention and which shows one possible form of a reflector which is employed with same.

Referring now to FIG. 8, for example, the signaling assembly 10 of the present invention includes a multifaceted reflector which is generally indicated by the numeral 150, and which is disposed in reflecting relation relative to the plurality of light emitting devices 121. This multifaceted reflector has a main body 151, which includes a first surface 152 which is disposed in rested relation thereagainst the circuit substrate 110, and an opposite second surface 153. Still further, the main body 151 includes a first peripheral edge 154, and an opposite, second peripheral edge 155. The main body is sized and shaped such that the main body of the reflector may be positioned in substantially covering relation relative to the circuit substrate 110. The main body, which forms the reflector 150, may further include a first portion 156, and a second portion 157, such as seen in FIGS. 14 and 15, respectively. As seen in the exploded views of FIGS. 8 and 9, the reflector 150 and more specifically the main body 151, is formed of a plurality of first portions 156. However, it will be recognized that the reflector may include various second portions 157 as seen in FIGS. 14 and 15, respectively. As illustrated most clearly by reference to FIGS. 8 and 9, an aperture 160 is defined by the main body 151, and is operable to receive the electrical coupler 123, therethrough.

The reflector 150, having a main body 151, can be fabricated by utilizing standard injection molding techniques, and post-reflective coating procedures, or in the alternative, may be pressure or vacuum formed from deformable sheets that already have a highly reflective coating formed thereon. As depicted in FIG. 14, the emitted electromagnetic radiation, which is generally indicated by the numeral 161, is substantially reflected by the multifaceted reflector 150, in a first direction to form the rearward component or signal 24, by a first group of reflector facets as will be discussed below; and the emitted electromagnetic radiation produced by a second light emitting device 121 is substantially reflected by a second group of reflector facets through the secondary region defined by the semitransparent mirror 50 and in a second direction to light a region adjacent to the overland vehicle 22, as seen in FIG. 3. These first and second directions are best understood by the study of FIG. 3. It should be appreciated that while the circuit substrate 110 shows individual light emitting diodes 121 disposed in predetermined spaced relation one to the other, it should be understood that pairs of individual light emitting diodes 121 may be disposed in close proximity to each other in order to accomplish the benefits of the present invention and which are described, above.

The reflector 150 defines a plurality of single discrete reflector cavities or pockets 162 which are oriented, as seen in FIG. 14, for example, in covering eccentric reflecting relation relative to the light emitting devices 121. As seen in FIGS. 12, 14 and 15, each of the reflector cavities or pockets 162 is defined by a sidewall 163. The sidewall further defines a plurality of reflector facets 164. The sidewall is coated with a highly reflective material which facilitates the reflection of the discernable electromagnetic radiation 161. The reflector facets 164 include multiple sets of reflector facets. Each of the respective groups of reflective facets may have multiple reflecting surfaces. The respective reflector facets may be quite distinct or smoothly blended together. As discussed above, emitted electromagnetic radiation 161 passes outwardly through the secondary region 64 of the semitransparent mirror 50, and in two different directions, that being in a first direction 165 and a second direction 166 as best seen by reference to FIG. 3. The emitted pattern of visibly discernable electromagnetic radiation traveling in the first direction 165 travels in a cone generally laterally outwardly relative to the overland vehicle 11. This cone shaped pattern produces the first or rearward component or visual signal 24 which can be seen by vehicles traveling adjacent thereto. Still further, the electromagnetic radiation traveling in the second direction 166 is operable to illuminate a region beside the overland vehicle 11 or the side of the vehicle itself to aid and assist the operator during reduced periods of visibility. As seen in FIG. 12, for example, the first portion 156 of the reflector 150 is disposed in substantially covering, eccentric reflecting relation relative to a light emitting device 121. However, in an alternative form of the invention, as seen in FIGS. 14 and 15, the reflector 150 may include a second portion 157. This portion of the reflector 157, as seen, is disposed in substantially concentric reflecting relation relative to one of the light emitting devices 121. In the arrangement as seen in FIGS. 14 and 15, the second portion 157 is operable to reflect emitted electromagnetic radiation 161 such that the radiation is directed through the cavity 40 of the housing 30, and passes out of the housing by way of the translucent lens 43 to form the second and forward component of the visibly discernable signal 25. Therefore, it will be seen that the reflector 150, which is borne by the circuit substrate 110, when energized, emits visibly discernable electromagnetic radiation 161 which is reflected by the reflector 150, and which travels in a direction generally away from the mirror 50 and does not pass through same upon leaving the reflector.

Referring now to FIGS. 8, 12 and 13, it will be seen that the signaling assembly 10 of the present invention includes a moveable mirror mounting plate which is generally indicated by the numeral 180. The mirror mounting plate has a main body 181 which is defined by a first surface 182, and an opposite second surface 183. The first surface is operable to be disposed in substantially juxtaposed, facing, relation relative to the heater 80, and the semitransparent mirror 50. In one form of the invention, the semitransparent mirror 50 and heater 80 are secured to the mounting plate by a layer of adhesive, not shown. The main body 181 has a peripheral edge 184 which receives the semitransparent mirror 50. As seen by reference to FIG. 8, the main body 181 of the moveable mirror mounting plate 180 includes a motor puck engagement region 185. This motor puck engagement area or region allows an electric motor 186, of conventional design, to forcibly engage the motor puck region in order to appropriately position the semitransparent mirror 50 in assorted orientations so that it may be used by an operator of the overland vehicle 11. As seen by reference to FIGS. 8 and 13, a plurality of windows 190 are formed in, or otherwise defined by the main body 171 of the mirror mounting plate 180, and are operable to be oriented so as to receive emitted electromagnetic radiation which may be generated by a plurality of electrically actuated assemblies 191 which may include among others, electro/optical sensors; warning icons; malfunction indicators; lights for illuminating given regions adjacent to the mirror; air temperature gauges; compass; near object detection devices; tire pressure indicators; traction warning indicators; speed sensors; radar alarms; fuel supply or engine temperature sensors; and video devices to name but a few. As a general matter, these electrically actuated assemblies 191 may include, without limitation, any assembly and/or warning device indicator which may be useful to the operator of the overland vehicle 11 in determining the operational status of the overland vehicle 11, or provide information of interest to the operator of same.

In the arrangement as shown in FIGS. 8 and 13, it will be seen that the moveable mirror mounting plate 180 includes a pair of biasing or support members 192 which straddles or otherwise individually extend across a defined aperture 193, and which receives, at least in part, the reflector 150 which is positioned in substantially covering relation relative to the circuit substrate 110. It will be recognized from a study of FIGS. 12 and 13 that the circuit substrate 110, in this form of the invention, is positioned in a sandwiched relationship therebetween the mirror mounting plate 180, and the underlying heater 80 or semitransparent mirror 50. In some forms of the invention, this arrangement may not be used. As seen by reference to FIG. 13, it will be understood that the pair of biasing or support members 192 allow, in one form of the invention, for the adjustable movement of the underlying circuit substrate 110, and reflector 150 (as indicated by the arrow in that view) for purposes of aligning these assemblies with the underlying semitransparent mirror 50, and more specifically the region 64 of the semitransparent mirror 50 which passes electromagnetic radiation. In other forms of the invention, these biasing or support members may be eliminated. It will be recognized therefore that the adjustably moveable mirror mounting plate 180 is disposed in force transmitting relation relative to the semitransparent mirror 50. The circuit substrate 110 is positioned, in at least on form of the invention, at least in part, therebetween the mirror mounting plate 180, and the semitransparent mirror 50. As best illustrated by reference to FIGS. 8 and 13, a fourth electrically conductive pathway 194 is provided. The fourth electrically conductive pathway which is indicated in hidden lines, includes a pair of electrical conduits each having a first end 195, and which has a first pair of electrical contacts 196 which are mounted on same (FIG. 8), and an opposite second end 197 (FIG. 13), which has a second pair of electrical contacts 198 individually connected to same. As will be recognized from the drawings, the first pair of electrical contacts 196 are operable to be electrically coupled to the circuit substrate 110, and the second pair of electrical contacts are operable to make electrical contact with the electrically actuated motor 186. It should be understood that this arrangement allows the electrically actuated motor 186, which is disposed in force transmitted relation relative to the mirror mounting plate 180 to be energized and/or controlled, at least in part, through the fourth electrical pathway 194 and the circuit substrate 110.

Operation

The operation of the described embodiments of the present invention are believed to be readily apparent and are briefly summarized at this point.

Referring now to FIG. 1 and following, it will be seen that a signal assembly 10 of the present invention includes, in one form, a mirror 50 which is operable to both reflect, and pass electromagnetic radiation 161; a circuit substrate 110 which is juxtaposed relative to the mirror 50, and which is operable to pass electromagnetic radiation 161, and wherein the circuit substrate is releasably electrically coupled with a source of electricity; and a first electrically conductive pathway 131 which is borne by the circuit substrate 110. In the arrangement as shown in the drawings, the invention 10 further includes a first light emitting device 121 which is borne by the circuit substrate 110, and which is further electrically coupled with the first electrically conductive pathway 131, and which, when energized, emits visibly discernable electromagnetic radiation 161 which passes by each of the circuit substrate 110, and the mirror 50; and a second electrically conductive pathway 132 which is borne by the circuit substrate 110 and which is electrically coupled with an electrically actuated assembly, such as a heater 80, and wherein the electrically actuated assembly 80 is coupled to the source of electricity by way of the circuit substrate 110.

In the arrangement as shown in the drawings, and which includes several possible forms of the invention, the mirror 50 may comprise a semitransparent mirror, a dichroic mirror (FIG. 7), or in the alternative, an electrochromic mirror element 70 (FIG. 16). Still further, and as earlier discussed, the signaling assembly 10 of the present invention may include an emitter 121; or a receiver of electromagnetic radiation 122 (FIG. 15), and which is operable to provide an electrical signal when exposed to electromagnetic radiation of a given wavelength. Therefore, the present invention 10 may include both an emitter of invisible electromagnetic radiation 121, as well as a receiver of electromagnetic radiation 122. In the invention as shown in FIG. 1, the mirror 50 has a primary region 63 which reflects visibly discernable electromagnetic radiation 161, and an adjacent secondary region 64 which reflects some visibly discernable electromagnetic radiation and further passes some visibly discernable electromagnetic radiation. This is seen most clearly by reference to FIG. 2. In the arrangement as seen in the drawings, and more specifically by reference to FIGS. 1 and 2, it will be understood that the first or primary region 63 may be substantially continuous, and the secondary region is discontinuous. In the event that a dichroic mirror 65 is employed, it will be seen that the primary and secondary regions 63 and 64 may be substantially continuous when seen from normal viewing distances.

The invention 10 further includes a reflector 150 which is borne by the circuit substrate 110, and which is disposed in substantially covering relation relative to at least some of the light emitting devices 121. In some forms of the invention, and as seen in FIG. 14, the reflector may include discrete reflector pockets 162, or further the reflector may include a first portion 156 and a second portion 157. As seen in FIG. 14, and in the form of the invention 10 which includes a reflector 150 having first and second portions 156 and 157, it will be understood that the first portion of the reflector 156 is disposed in substantially eccentric reflecting relation relative to the light emitting device 121, and wherein the light emitting device, when energized, emits visibly discernable electromagnetic radiation 161 which is reflected by the reflector 150, and which passes, at least in part, through each of the circuit substrate 110, and the mirror 50. Further, and in the form of the invention 10 where the reflector 150 includes a second portion 157, it will be understood that the second portion 157 is disposed in substantially concentric reflecting relation relative to at least one of the light emitting devices 121, and wherein the light emitting device, when energized, emits visibly discernible electromagnetic radiation 161 which is reflected by the second portion of the reflector 157, and which travels in a direction away from the mirror 50. In the form of the invention 10 as seen in FIG. 14, and where the reflector 150 includes a first portion 156 and a second portion 157, it will be understood that at least two light emitting devices 121 as seen in FIG. 1, when energized, respectively emit visibly discernible electromagnetic radiation 161 which forms at least two discrete, visibly discernible signals 24 and 25. As understood by a study of FIG. 4, these two discrete signals provide a means for signaling adjacent vehicles which are positioned in a wide range of different angles and positions relative to the overland vehicle 11.

Emitted electromagnetic radiation 161 which might be passed by the semitransparent mirror 50 is normally emitted by a plurality of light emitting devices 121 which are typically mounted on the circuit substrate 110. However, in some forms of the invention, the light emitting device may include a secondary light emitting device 125 which delivers emitted electromagnetic radiation into a light pipe or fiber optic cable 126. The fiber optic cable 126, in turn, discharges light which has been emitted in an appropriate orientation such that it may be passed by the semitransparent mirror 50. The invention 10 further includes an electrical coupler 123 which is borne by the circuit substrate 110 and which is operable to releasably electrically couple with a source of electricity. In the arrangement as shown, the electrically actuated assembly is an electrical heater 80 which is mounted in juxtaposed relation relative to the mirror 50, and wherein the electrical heater 80 is electrically coupled to, and energized through, the second electrically conductive pathway 132. In an alternative form of the invention as seen in FIG. 16, the semitransparent mirror 50 may comprise an electrochromic mirror element 70 which may be electrically coupled to the second electrically conductive pathway 132, or alternatively to the third electrically conductive pathway 133. In this arrangement, as shown, an electrochromic mirror 70 may be controlled and/or energized, at least in part, through the circuit substrate 110. As seen in FIG. 8, other electrically actuated assemblies 191 may be provided. These assemblies may include assorted other electrical devices which are selected from the group which includes electro/optical sensors; heaters; warning icons; malfunction indicators; lights for illuminating given regions adjacent to the mirror; air temperature gauges; compass; near object detection devices; and video devices.

In at least one form of the invention as seen in FIG. 8, the heater 80 is made integral with a heater substrate, and the circuit substrate 110 is positioned thereagainst the heater substrate, and may be secured thereto by a layer of adhesive. Moreover, and as seen in the drawings (FIG. 9), the heater 80 and associated heater substrate define a region 96 which receives the circuit substrate 110. Still further, in one form of the invention (FIG. 8) the heater and heater substrate define a region 85 which passes the visibly discernible electromagnetic radiation which is emitted by the light emitting devices 121. In one form of the invention 10 as seen in FIG. 10, the circuit substrate 110 is substantially opaque and further defines at least one aperture 120 which is operable to pass the visibly discernible electromagnetic radiation 161 which is emitted by the light emitting device 121. The aperture 120 which is defined by the circuit substrate is substantially aligned with the region of the heater 85 which passes the visibly discernible electromagnetic radiation 161. In another form of the invention (FIG. 9), the circuit substrate 110 has peripheral edges 114 and 115, which are located adjacent to the region of the heater 85 which passes visibly discernible electromagnetic radiation. In this arrangement, the light emitting device 120 emits visibly discernible electromagnetic radiation which passes, at least in part, by the peripheral edge 114 of the circuit substrate 110, and through the region of the heater and heater substrate which passes visibly discernible electromagnetic radiation 161.

A mounting plate or movable mirror mounting plate 180 is provided, and which receives, at least in part, the semitransparent mirror 50. Still further, in one form of the invention 10 (FIG. 8), a fourth electrical pathway 194 is provided and which is borne by the mirror mounting plate 180 and which is further releasably electrically coupled with the circuit substrate 110. An electrically actuated motor 186 is provided, and which is disposed in force transmitting relation relative to the mirror mounting plate 180, and is further electrically coupled with the fourth electrical pathway. The electrically actuated motor 186 is controlled and/or energized, at least in part, through the fourth electrical pathway, and the circuit substrate 110. The present invention 10 is operable to accommodate a number of additional electrically actuated assemblies or sensors 191. The respective electrically actuated assemblies or sensors 191 provide information to an operator of the overland vehicle 11 regarding the operational status of the vehicle or information of interest to the operator.

Therefore a signal assembly 10 of the present invention includes a mirror housing 30 which is borne by the overland vehicle 11 and which is defined by a sidewall 31, and wherein the sidewall further defines a cavity 40 which communicates with a mirror aperture 35. The signal assembly 10 further includes a semitransparent mirror 50 which is operable to simultaneously pass and reflect visibly discernable electromagnetic radiation 161 and wherein the semitransparent mirror substantially occludes the mirror aperture 35. As seen in the drawings (FIG. 8), an electrically actuated heater 80 is positioned in the cavity 40 of the housing 30, and disposed in juxtaposed heat transferring relation relative to the semitransparent mirror 50. The heater defines a region 85 through which visibly discernable electromagnetic radiation 161 may pass. A circuit substrate 110 is provided and positioned in juxtaposed relation relative to the heater 80, and further defines a second region, composed of a plurality of apertures 120, or a region immediately adjacent to the peripheral edge 114 thereof (FIG. 11), and through which visibly discernable electromagnetic radiation 161 may pass. As should be understood from the drawings, the first region 85 as defined by the heater 80; and the second region 120 or 114 as defined by the circuit substrate 110 are substantially aligned. In the various forms of the invention as shown in the various figures, an electrical coupler 123 is provided and which is borne by the circuit substrate 110 and which is configured to releasably electrically couple with a source of electricity which is typically provided by the overland vehicle 11. A first electrical pathway 131 is provided, and which is borne by the circuit substrate 110, and which is electrically coupled to the electrical coupler. Still further, a light emitting device 121 is borne by the circuit substrate 110 and is positioned in spaced relation relative to the first and the second regions as described above. The light emitting device 121, when energized by the source of electricity, emits visibly discernable electromagnetic radiation 161 which passes out of the mirror housing 30 and forms a visibly discernable signal 24 and/or 25 as seen in FIG. 3. A second electrical pathway 132 is borne by the circuit substrate 110 and which is electrically coupled with the electrical coupler 123, and the heater 80. The heater 80 is energized through the circuit substrate 110. Yet further, a reflector 150 is provided, and which is disposed in reflecting relation relative to the light emitting device 121, and which is operable to direct the emitted visibly discernable electromagnetic radiation, at least in part, through the first and second regions mentioned above. A mirror mounting plate 180 is provided and which is operable to matingly receive, at least in part, a portion of the semitransparent mirror 50, and wherein the circuit substrate is positioned, at least in part, therebetween the mirror mounting plate and the heater 80.

In the arrangement as seen in the drawings, the sidewall 31 of the mirror housing 30 defines a second aperture 42 which communicates with the cavity 40 and which is operable to pass visibly discernable electromagnetic radiation 161. In the arrangement as seen in FIG. 14, the light emitting device 121 may comprise first and second light emitting devices 121, and wherein the reflector 150 includes a first portion 156 which is disposed in substantially eccentric covering relation relative to the first light emitting device, and wherein the first portion of the reflector is operable to substantially reflect the emitted visibly discernable electromagnetic radiation 161 through the first and second regions described in the paragraph above so that the emitted electromagnetic radiation may pass through the semitransparent mirror 50 in a first direction 165, and which forms the first signal 24; and wherein the second portion 157 of the reflector 150 is operable to reflect, at least in part, a portion of the visibly discernable electromagnetic radiation emitted by the second light emitting device 121, when energized, and wherein the emitted visibly discernable electromagnetic radiation 161 emitted by the second light emitting device passes through the second aperture 42 and forms a second visibly discernable signal 25. As seen in FIG. 3, the reflector 150 may also be formed in a manner whereby that emitted electromagnetic radiation may pass out from the mirror housing in the direction labeled 166 as seen in FIG. 3, and illuminate the side or region 22 adjacent to the overland vehicle 11.

Therefore it will be seen that the signaling assembly of the present invention 10 provides many advantages over the prior art devices which have been utilized heretofore. The present invention 10 is compact, cost effective and provides a convenient means whereby various visibly discernable electromagnetic radiation signals may be either transmitted or received while simultaneously reducing the number of electrical conduits or "pigtails" which are routed through the mirror housing 30. This reduction in the number of electrical conduits provides for easy assembly and installation in mirror housings which typically have reduced interior dimensions.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A signal assembly, comprising:
   a mirror which is operable to both reflect, and pass electromagnetic radiation;
   a circuit substrate juxtaposed relative to the mirror, and which is operable to pass electromagnetic radiation, and wherein the circuit substrate is releasably electrically coupled with a source of electricity;
   a first electrically conductive pathway borne by the circuit substrate;

at least two light emitting devices borne by the circuit substrate and electrically coupled with the first electrically conductive pathway, and which, when energized, emits visibly discernable electromagnetic radiation which passes, at least in part, by each of the circuit substrate and the mirror; and a second electrically conductive pathway borne by the circuit substrate and which is electrically coupled with an electrical heater, and wherein the electrical heater is coupled to the source of electricity by way of the circuit substrate, and is further mounted in juxtaposed relation relative to the mirror; and a reflector having a first portion which is positioned in eccentric reflecting relation relative to one of the two light emitting devices, and a second portion which is disposed in substantially concentric reflecting relation relative to the remaining light emitting device, and wherein the at least two light emitting devices, when energized, emit visibly discernible electromagnetic radiation which forms at least two discrete, visibly discernible signals.

2. A signal assembly as claimed in claim 1, and wherein the mirror is a semitransparent mirror.

3. A signal assembly as claimed in claim 1, and wherein the mirror is a dichroic mirror.

4. A signal assembly as claimed in claim 1, and wherein the mirror is an electrochromic mirror.

5. A signal assembly as claimed in claim 1, and further comprising:

an emitter of invisible electromagnetic radiation and which is electrically coupled with the circuit substrate, and which, when energized, emits invisible electromagnetic radiation which passes through the mirror.

6. A signal assembly as claimed in claim 1, and further comprising:

a receiver of electromagnetic radiation, and wherein the receiver is electrically coupled with the circuit substrate and which is operable to provide an electrical signal when exposed to electromagnetic radiation of a given wavelength.

7. A signal assembly as claimed in claim 1, and further comprising:

an emitter of invisible electromagnetic radiation which is electrically coupled with the circuit substrate, and which, when energized, emits invisible electromagnetic radiation which passes, at least in part, through the mirror; and a receiver of electromagnetic radiation and which is electrically coupled with the circuit substrate and which further, when exposed to a given wavelength of electromagnetic radiation produces an electrical signal.

8. A signal assembly as claimed in claim 1, and wherein the mirror has a primary region which reflects visibly discernable electromagnetic radiation, and an adjacent secondary region which reflects some visibly discernable electromagnetic radiation and further passes some visibly discernable electromagnetic radiation.

9. A signal assembly as claimed in claim 8, and wherein the primary region is substantially continuous, and the secondary region is discontinuous.

10. A signal assembly as claimed in claim 8, and wherein both the primary and secondary regions of the mirror are substantially continuous.

11. A signal assembly as claimed in claim 1, and further comprising:

at least one electrical coupler which is borne by the circuit substrate, and which is operable to releasably electrically couple with the source of electricity.

12. A signal assembly as claimed in claim 1, and wherein the mirror comprises an electrochromic mirror which is electrically coupled to the second electrically conductive pathway.

13. A signal assembly as claimed in claim 1, and wherein the mirror comprises an electrochromic mirror which is controlled at least in part through the circuit substrate.

14. A signal assembly as claimed in claim 1, and wherein the second electrically conducted pathway may be further electrically coupled to an electrically actuated assembly which is selected from the group which comprises electro/optical sensors; heaters; warning icons; malfunction indicators; lights for illuminating given regions adjacent to the mirror; air temperature gauges; compass; near object detection devices; and audio and/or video devices.

15. A signal assembly as claimed in claim 1, and wherein the heater is made integral with a heater substrate, and wherein the circuit substrate is positioned thereagainst the heater substrate.

16. A signal assembly as claimed in claim 15, and wherein the heater and heater substrate define a region which receives the circuit substrate.

17. A signal assembly as claimed in claim 15, and wherein the heater and heater substrate define a region which passes the visibly discernible electromagnetic radiation which is emitted by the light emitting device.

18. A signaling assembly as claim 17, and wherein the circuit substrate is substantially opaque and further defines at least one aperture which is operable to pass the visibly discernible electromagnetic radiation which is emitted by the at least two light emitting devices, and wherein the aperture which is defined by the circuit substrate is substantially aligned with the region of the heater and the heater substrate which passes the visibly discernible electromagnetic radiation.

19. A signaling assembly as claimed in claim 17, and wherein the circuit substrate has a peripheral edge which is located adjacent to the region of the heater and heater substrate which passes visibly discernible electromagnetic radiation, and wherein at least one of the light emitting devices emits visibly discernible electromagnetic radiation which passes, at least in part, by the peripheral edge of the circuit substrate, and through the region of the heater and heater substrate which passes visibly discernible electromagnetic radiation.

20. A signal assembly comprising:

a semitransparent mirror having a first and a second surface;

an electrically actuated heater disposed in heat transferring relation relative to the second surface of the mirror, and wherein the heater defines a first region through which electromagnetic radiation may pass;

a circuit substrate juxtaposed relative to the heater, and wherein the circuit substrate defines a second region through which electromagnetic radiation may pass, and wherein the first and second regions are substantially aligned;

a first electrical pathway borne by the circuit substrate, and which is releasably electrically coupled with a source of electricity;

a light emitting device borne by the circuit substrate, and which is electrically coupled with the first electrical pathway, and wherein the light emitting device, when energized, by the source of electricity, emits visibly discernable electromagnetic radiation which is reflected, at least in part, through the first and second regions;

a second electrical pathway, borne by the circuit substrate, and electrically coupled to the heater, and the source of electricity, and wherein the heater is energized by the source of electricity passing through the second electrical pathway;

a reflector disposed in substantially eccentric reflecting relation relative to the light emitting device, and wherein the reflector is disposed in substantially covering relation over at least a portion of the circuit substrate; and at least one electrical coupler which is releasably electrically coupled with a source of electricity, and further is electrically coupled with the first and second electrical pathways, and wherein the electrical coupler is borne by the circuit substrate and extends through the reflector.

21. A signaling assembly as claimed in claim 20, and further comprising:

an electromagnetic radiation emitter which is electrically coupled with the circuit substrate, and which, when energized emits invisible electromagnetic radiation, which is passed, at least in part, by the semitransparent mirror.

22. A signaling assembly as claimed in claim 20, and further comprising:

an electromagnetic radiation receiver which is electrically coupled to the circuit substrate, and which is operable, when exposed to a source of electromagnetic radiation of a given wavelength, produces an electrical signal.

23. A signaling assembly as claimed in claim 20, and further comprising:

an electromagnetic radiation emitter which is electrically coupled with the circuit substrate, and which, when energized, emits electromagnetic radiation which does not pass through the mirror, but is transmitted in a direction which is away from the second surface of the semitransparent mirror.

24. A signal assembly as claimed in claim 20, and wherein the semitransparent mirror is a dichroic mirror.

25. A signal assembly as claimed in claim 20, and wherein the semitransparent mirror is an electrically actuated electrochromic mirror, and wherein the signal assembly further comprises a third electrical pathway which is borne by the circuit substrate and wherein the electrochromic mirror is energized by way of the third electrical pathway.

26. A signal assembly as claimed in claim 20, and wherein the semitransparent mirror is an electrically actuated electrochromic mirror, and wherein the signaling assembly further comprises a third electrical pathway which is borne by the circuit substrate, and which is controllably electrically coupled with the electrochromic mirror.

27. A signal assembly as claimed in claim 26, and wherein the visibly discernable electromagnetic radiation emitted by the light emitting device is reflected, at least in part, by the reflector, and thereafter passes through the first and second regions, and the semitransparent mirror.

28. A signal assembly as claimed in claim 27, and wherein the light emitting device is disposed in adjacent spaced relation relative to the first and second regions.

29. A signal assembly as claimed in claim 20, and wherein the circuit substrate is mounted in substantially fixed relation relative to the first and second regions.

30. A signal assembly as claimed in claim 20, and wherein the circuit substrate is selectively movable relative to the first and second regions.

31. A signal assembly as claimed in claim 20, and further comprising:

a mounting plate which is disposed in force transmitting relation relative to the semitransparent mirror, and wherein the circuit substrate is positioned, at least in part, therebetween the mounting plate and the semitransparent mirror.

32. A signal assembly as claimed in claim 31, and wherein the mounting plate comprises a movable mirror mounting plate which receives, at least in part, the semitransparent mirror, and wherein a fourth electrical pathway is borne by the mirror mounting plate and is further releasably electrically coupled with the circuit substrate, and wherein the signal assembly further comprises:

an electrically actuated motor which is disposed in force transmitting relation relative to the mirror mounting plate, and which is further electrically coupled with the fourth electrical pathway, and wherein the electrically actuated motor is controlled, at least in part, through the fourth electrical pathway, and the circuit substrate.

33. A signal assembly as claimed in claim 20, and further comprising:

a third electrical pathway which is borne by the circuit substrate and which is releasably electrically coupled with the source of electricity, and wherein the signal assembly further comprises an electrically actuated assembly which is selected from the group comprising electro/optical sensors; warning lamps; malfunction indicators; lights for illuminating a given area; air temperature indicators; compass; audio and/or video devices; and visibly discernable alphanumeric display devices.

34. A signal assembly as claimed in claim 33, and wherein the signal assembly is borne by an overland vehicle, and wherein the respective electrically actuated assemblies provide information to an operator of the overland vehicle regarding the operational status of the overland vehicle.

35. A signal assembly as claimed in claim 34, and further comprising:

at least one electrical coupler which is borne by the heater and disposed in spaced relation relative to the circuit substrate, and wherein the electrical coupler is releasably electrically coupled with a source of electricity, and further electrically coupled with the first and second electrical pathways.

36. A signal assembly for an overland vehicle, comprising:

a mirror housing which is borne by the overland vehicle, and which is defined by a sidewall, and wherein the sidewall further defines a cavity which communicates with a mirror aperture;

a semitransparent mirror which is operable to simultaneously pass and reflect, visibly discernable electromagnetic radiation, and wherein the semitransparent mirror substantially occludes the mirror aperture;

an electrically actuated heater positioned in the cavity of the housing, and disposed in juxtaposed heat transferring relation relative to the semitransparent mirror, and wherein the heater defines a first region through which visibly discernable electromagnetic radiation may pass;

a circuit substrate positioned in juxtaposed relation relative to the heater and further defining a second region through which visibly discernable electromagnetic radiation may pass, and wherein the first and second regions are substantially aligned;

at least one electrical coupler borne by the circuit substrate and which is configured to releasably electrically couple with a source of electricity which is provided by the overland vehicle;

a first electrical pathway borne by the circuit substrate and electrically coupled to the electrical coupler;

first and second light emitting devices borne by the circuit substrate and positioned in spaced relation relative to the first and second regions, and wherein the light emitting devices, when energized, by the source of electricity, emits visibly discernable electromagnetic radiation which passes, at least in part, out of the mirror housing and forms a visibly discernable signal;

a second electrical pathway borne by the circuit substrate and which is electrically coupled with the electrical coupler and with the heater, and wherein the heater is energized through the circuit substrate;

a reflector having a first portion which is disposed in reflecting relation relative to the first light emitting device, and which is operable to direct the emitted visibly discernable electromagnetic radiation of the first light emitting device, at least in part, through the first and second regions and wherein the first portion of the reflector is disposed in substantially eccentric reflecting relation relative to the first light emitting device; and a mirror mounting plate which is operable to matingly receive, at least in part, a portion of the semitransparent mirror, and wherein the circuit substrate is positioned, at least in part, therebetween the mirror mounting plate and the heater, and wherein the first light emitting device, when energized, emits visibly discernable electromagnetic radiation which passes through the semitransparent mirror and which forms a first visibly discernable signal, and wherein the second light emitting device, when energized, emits visibly discernable electromagnetic radiation which passes through the semitransparent mirror, and which illuminates a side of the overland vehicle and/or a region which is immediately adjacent to the overland vehicle.

37. A signal assembly as claimed in claim 36, and wherein the semitransparent mirror is a dichroic mirror.

38. A signal assembly as claimed in claim 36, and wherein the semitransparent mirror is an electrically actuated electrochromic mirror, and wherein the electrochromic mirror is controlled, at least in part, through the circuit substrate.

39. A signal assembly as claimed in claim 36, and wherein the sidewall of the mirror housing defines a second aperture which communicates with the cavity and which is operable to pass visibly discernable electromagnetic radiation, and wherein the first portion of the reflector is operable to substantially reflect the emitted visibly discernable electromagnetic radiation through the first and second regions so that the emitted electromagnetic radiation may pass through the semitransparent mirror to form a first visibly discernable signal, and wherein the second portion of the reflector is operable to reflect, at least in part, a portion of the visibly discernable electromagnetic radiation emitted by the second light emitting device, when energized, and wherein the emitted visibly discernable electromagnetic radiation emitted by the second light emitting device passes through the second aperture and forms a second visibly discernable signal.

40. A signal assembly as claimed in claim 36, and further comprising:

an electrically actuated device which is electrically coupled with the circuit substrate.

41. A signal assembly as claimed in claim 40, and wherein the electrically actuated assembly is configured to provide information regarding the operational status of the overland vehicle, and/or information of interest to an operator of the overland vehicle.

42. A signal assembly as claimed in claim 36, and further comprising:

an electrical pathway borne by the mirror mounting plate and which is electrically coupled to the circuit substrate and the electrical coupler; and an electrical device borne by the mirror mounting plate and which is coupled to the electrical pathway.

43. A signal assembly as claimed in claim 42, and further comprising:

an electrically actuated motor which is mounted in the cavity and which is defined by the mirror housing sidewall, and wherein the electrically actuated motor is coupled in force transmitting relation relative to the mirror mounting plate, and is operable, when energized, to selectively position the semitransparent mirror relative to the overland vehicle.

* * * * *